United States Patent [19]

Fujimoto

[11] Patent Number: 5,444,546
[45] Date of Patent: Aug. 22, 1995

[54] IMAGE SIGNAL PROCESSING APPARATUS HAVING MULTIPLEXING CAPABILITY

[75] Inventor: Ryo Fujimoto, Kanagawa, Japan

[73] Assignee: Canon Kabushiki Kaisha, Tokyo, Japan

[21] Appl. No.: 326,061

[22] Filed: Oct. 19, 1994

Related U.S. Application Data

[63] Continuation of Ser. No. 32,419, Mar. 16, 1993, abandoned, which is a continuation of Ser. No. 609,812, Nov. 6, 1990, abandoned.

[30] Foreign Application Priority Data

Nov. 10, 1989 [JP] Japan ................. 1-291295
Nov. 10, 1989 [JP] Japan ................. 1-291296
Nov. 10, 1989 [JP] Japan ................. 1-291297

[51] Int. Cl.$^6$ ................. H04N 5/76; H04N 5/91
[52] U.S. Cl. ................. 358/335; 358/323
[58] Field of Search ............. 358/335, 906, 330, 323, 358/326, 327, 337, 342; 360/27, 33.1; 369/48, 49; H04N 5/76, 5/91

[56] References Cited

U.S. PATENT DOCUMENTS 4,672,470  6/1987  Morimoto et al. ............ 358/323
4,682,250  7/1987  Hirota ...................... 358/335
4,819,086  4/1989  Hayashi et al. .............. 358/327

Primary Examiner—Jeffery Brier
Assistant Examiner—Huy Nguyen
Attorney, Agent, or Firm—Robin, Blecker, Daley & Driscoll

[57] ABSTRACT

An image signal recording and reproducing system records an image signal on a recording medium and reproduces a recorded image signal from the recording medium. The system is arranged to record information indicative of the values of M and N which satisfy $f_{so}/M = f_r/N$ (M and N: integers) on the recording medium together with a sampling image signal generated by sampling at a sampling frequency $f_{so}$ and a pilot signal having a frequency $f_r$. Accordingly, it is possible to record and reproduce an image signal on and from the recording medium with the compatibility of the image signal retained irrespective of a sampling frequency.

15 Claims, 18 Drawing Sheets

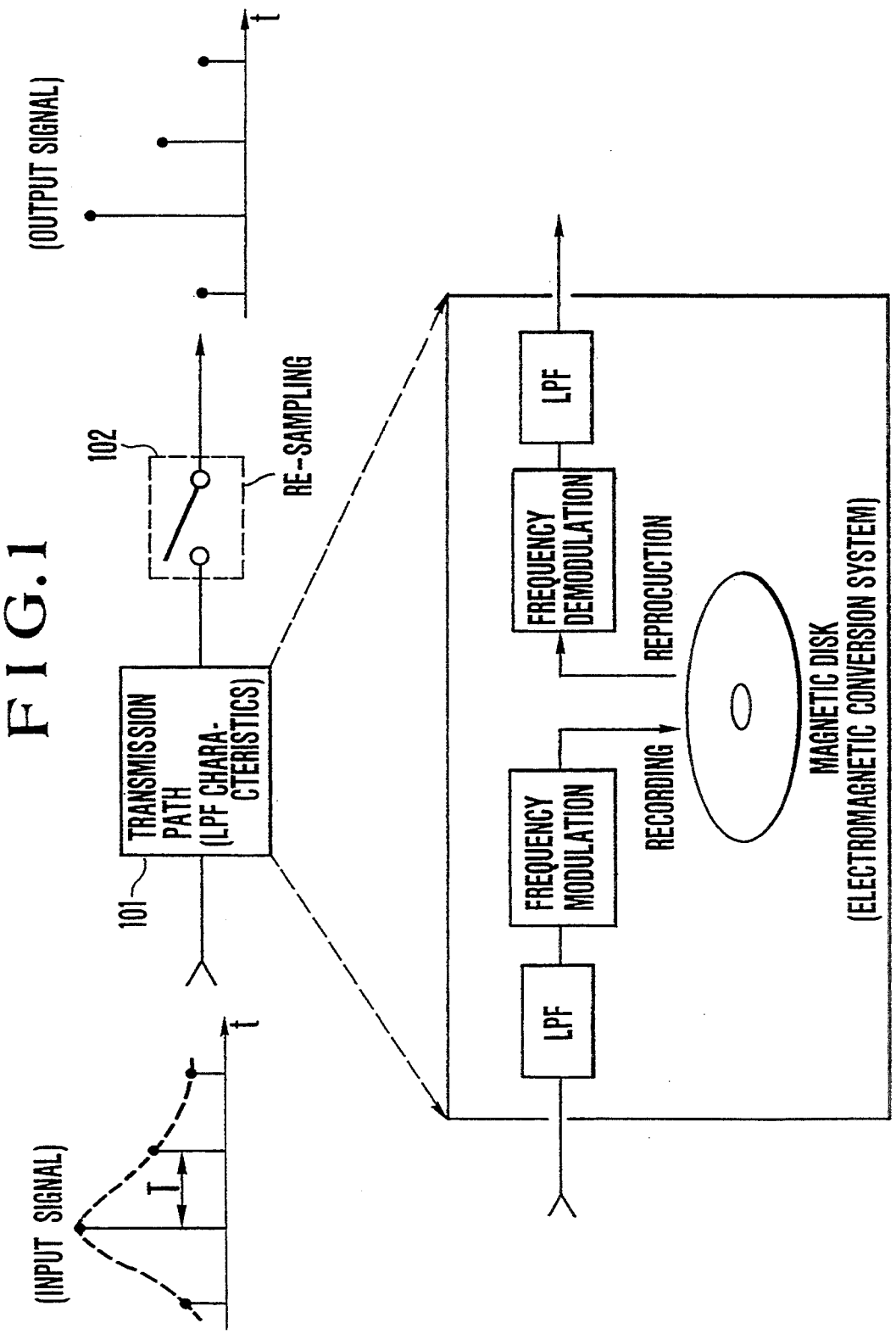

FIG.2(a) INPUT SIGNAL 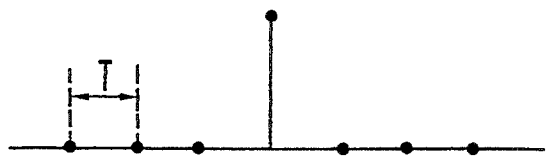
FIG.2(b) TRANSMISSION PATH OUTPUT SIGNAL 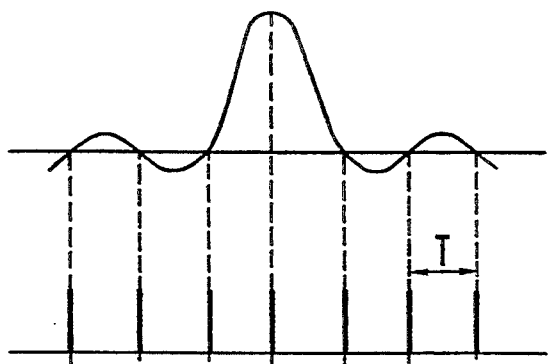
FIG.2(c) RE-SAMPLING PULSE
FIG.2(d) OUTPUT SIGNAL (RE-SAMPLE OUTPUT) 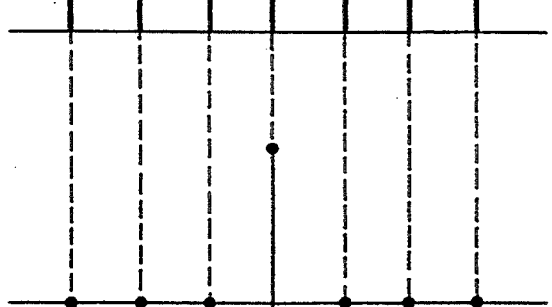
FIG.2(e) RE-SAMPLING PULSE OUT OF PHASE 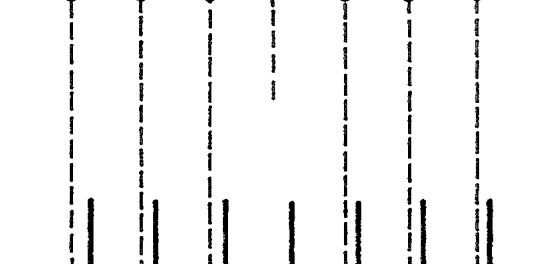
FIG.2(f) RE-SAMPLE OUTPUT RELATIVE TO FIG.2(e) 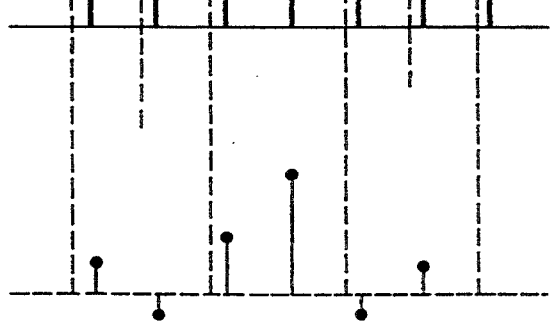

FIG.8

| | FIRST STEP (FIRST TWO-CHANNEL SIMULTANEOUS RECORDING) | SECOND STEP (SECOND TWO-CHANNEL SIMULTANEOUS RECORDING) |
|---|---|---|
| RECORDING TRACK | TRACKS 1, 2 | TRACKS 4, 3 |
| RECORDING SIGNAL | (TRACK 1) $\begin{bmatrix} Y(A_i) \\ C_R(A_i)/C_B(B_i) \end{bmatrix}$ (TRACK 2) $\begin{bmatrix} Y(B_i) \\ C_B(B_i)/C_R(A_i) \end{bmatrix}$ | (TRACK 3) $\begin{bmatrix} Y(D_i) \\ C_B(D_i)/C_R(C_i) \end{bmatrix}$ (TRACK 4) $\begin{bmatrix} Y(C_i) \\ C_R(C_i)/C_B(D_i) \end{bmatrix}$ |
| IMAGING SECTION OUTPUT $(Y_1, Y_2, R, B)$ | $Y_1 = Y(A_i)$<br>$Y_2 = Y(B_i)$<br>$R = R(A_i)$<br>$B = B(B_i)$ | $Y_1 = Y(D_i)$<br>$Y_2 = Y(C_i)$<br>$R = R(C_i)$<br>$B = B(D_i)$ |

IN THE ABOVE TABLE
$\begin{Bmatrix} Y(*) : Y \text{ SIGNAL ON LINE } * \\ C_R(*) : C_R \text{ SIGNAL ON LINE } * \\ C_B(*) : C_B \text{ SIGNAL ON LINE } * \\ R(*) : R \text{ SIGNAL ON LINE } * \\ B(*) : B \text{ SIGNAL ON LINE } * \end{Bmatrix}$

DRIVE SIGNAL FOR SOLID-STATE IMAGE SENSOR

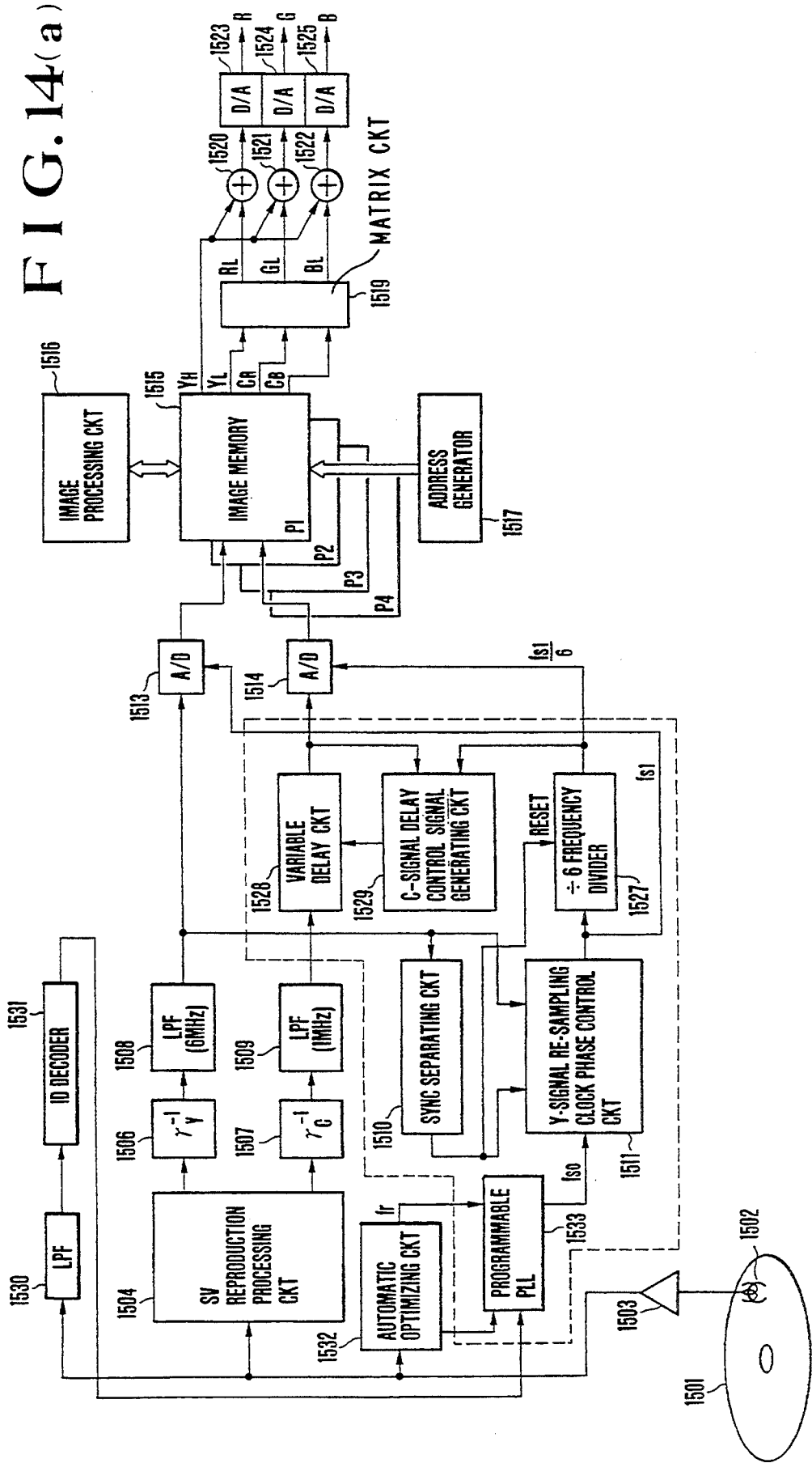

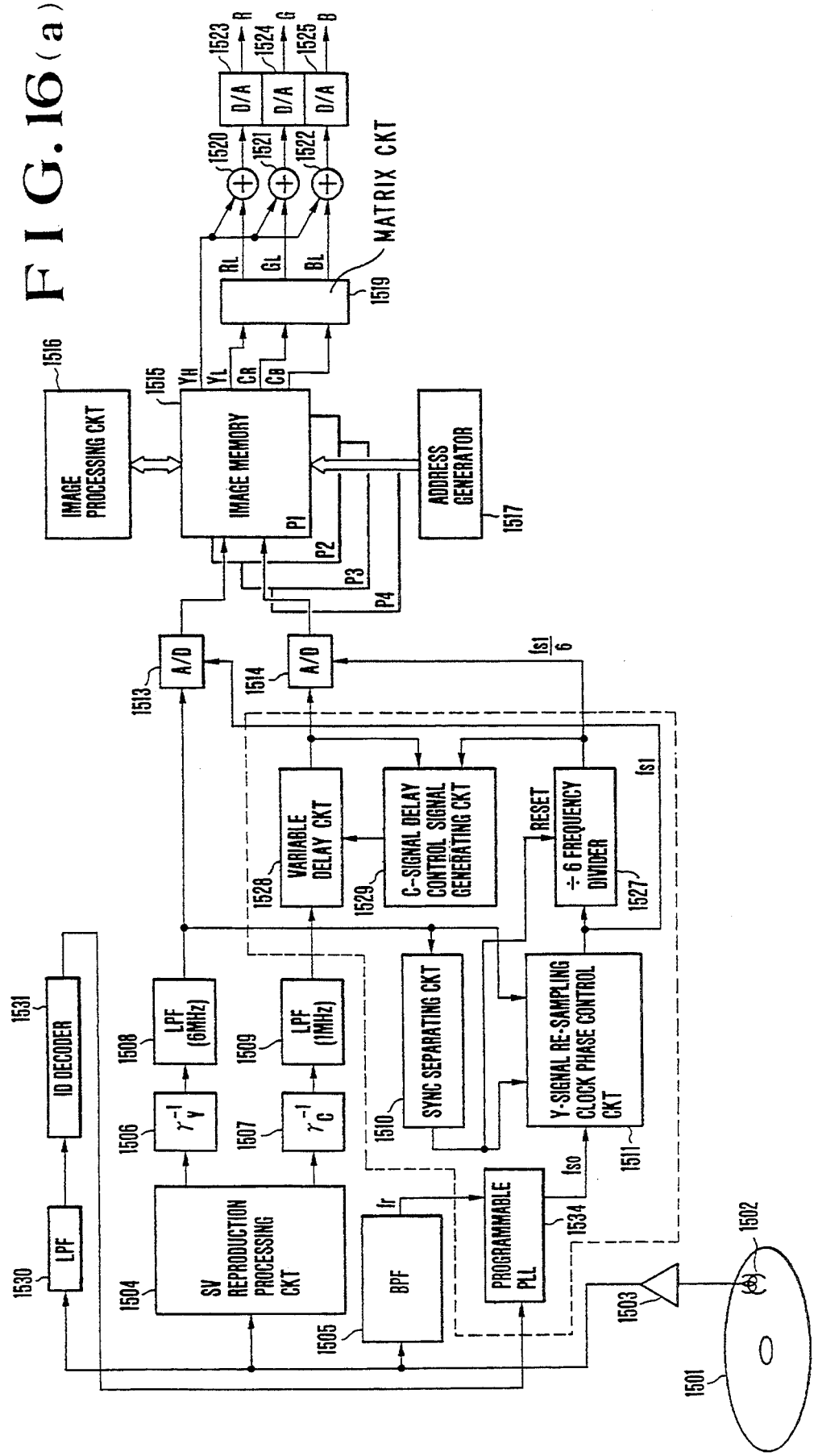

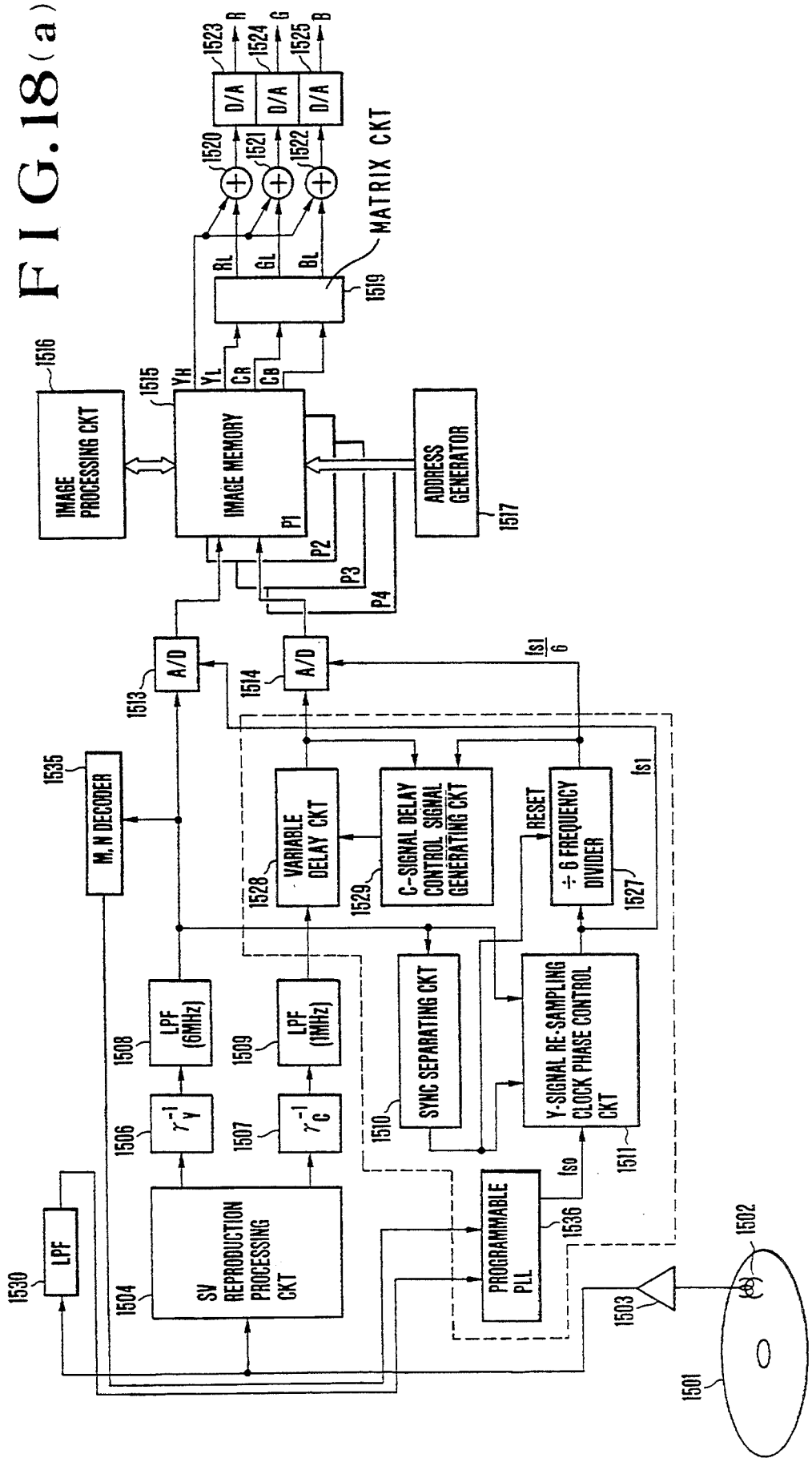

IMAGE SIGNAL PROCESSING APPARATUS HAVING MULTIPLEXING CAPABILITY

This is a continuation application under 37 CFR 1.62 of prior application Ser. No. 08/032,419 filed Mar. 16, 1993 (aban.) which is a cont. of Ser. No. 07/609,812 filed Nov. 6, 1990 (aban.).

BACKGROUND OF THE INVENTION

1. Field of the Invention

The present invention relates to an image signal recording and reproducing system for recording an image signal on a recording medium and for reproducing a recorded image signal from the recording medium.

2. Description of the Related Art

Still video (SV) systems are known as one type of system for recording and reproducing still image signals. The SV systems are commonly arranged to frequency-modulate and record television (TV) signals of an existing format on 2-inch magnetic disks. However, the resolution attained with such a system is limited to that of an existing TV system. For this reason, it is pointed out that, if a printer is used to produce a final printout of a still image recorded by the SV system, the obtained image quality (particularly, the resolution) will be low compared to that of a typical silver-salt photograph.

It is also known that several novel television systems, such as a high-definition television (HDTV) system, have recently been proposed. The HDTV system has approximately one thousand scanning lines which are about twice the number of scanning lines used in an existing NTSC system, and also has a horizontal signal band which can accommodate such a large number of scanning lines. Accordingly, in the field of SV systems, it has been strongly desired to develop a still image recording and reproducing system capable of recording and reproducing a still image signal which corresponds to the image quality of 1,000×1,000 pixels (per square image area on a TV screen) realized by the HDTV system or the like.

In light of the above-described circumstances, it has been proposed to provide an SV system which adopts a high-band (wide-band) recording format relative to a recording medium. However, it is necessary to improve the image quality of the SV system while retaining compatibility with conventional systems.

One method of improving the image quality while retaining compatibility with conventional systems is what is called a CHSV (compatible high-definition SV) system.

The outline of the CHSV system will be described below.

The CHSV system utilizes an art called analog transmission of sample values.

A system for analog transmission of sample values is, as shown in FIG. 1, characterized by a transmission-path characteristic (LPF characteristic) and re-sampling. More specifically, the system is arranged so that the input sample value is restored by re-sampling after being passed through a frequency modulation section, an electromagnetic conversion section and a frequency demodulation section.

The principle of the analog transmission of sample values is explained in more detail with reference to FIGS. 2(a) to 2(f). In the following explanation, it is assumed that a sequence of sample values of period T, shown in FIG. 2(a), is recorded and reproduced. The transmission path which includes the frequency modulation section, the frequency demodulation section and the electromagnetic conversion section has a low-band transmission characteristic, i.e., a low-pass filter (LPF) characteristic. FIG. 2(b) shows the output of this transmission path. If the illustrated transmission-path output is re-sampled by means of a sequence of re-sampling pulses which has period T and correct phase, as shown in FIG. 2(c), the output signal shown in FIG. 2(d) is provided. As can be seen from FIG. 2(d), the sequence of input sample values is correctly reproduced (transmitted). However, if the re-sampling pulses are out of phase as shown in FIG. 2(e), the sequence of sample values is not correctly reproduced (transmitted), resulting in ringing such as that shown in FIG. 2(f). Accordingly, to accomplish the above-described analog transmission of sample values, during reproduction (on a receiving side) it is necessary to generate a sequence of re-sampling pulses of correct frequency (period) corresponding to the reproduced (received) sample-value signals, and it is also necessary to generate a sequence of re-sampling pulses of correct phase corresponding to the reproduced (received) sample-value signals.

The other requirement for completely transmitting sample-value signals is as follows: the transmission path, including the frequency modulation and demodulation sections and the electromagnetic conversion section, has a linear phase and a frequency characteristic which is point-symmetrical about a sampling frequency $f_s/2 (=\frac{1}{2})$.

More specifically, it is necessary that the transmission path have an LPF characteristic such as that shown in FIG. 3. The outline of the analog transmission of sample values has been explained in brief.

The following is an explanation of a method of recording a luminance (Y) signal on the basis of the CHSV system.

FIG. 4 is a diagram showing sample points for a Y signal to be recorded on a magnetic disk. As shown in FIG. 4, the sample points for a Y signal are arranged in an offset manner, and are subjected to sub-sampling transmission. Also, 650(=1300/2) sample points are present in each row, while 500(=1000/2) sampling points are present in each column. The sample values contained in rows $A_1$, $A_2$ . . . are recorded on a signal track on the magnetic disk, the sample values contained in rows $B_1$, $B_2$ . . . on another track, and so on. In this manner, all the sample points are recorded on a total of four tracks.

The sample points are recorded on each track in a format according to a known SV format. FIG. 5 shows the frequency allocation of a signal recorded in the SV format. As shown in FIG. 5, in the SV format, the basebands of recorded Y and C signals are approximately 6.5 MHz or less and approximately 1 MHz or less, respectively.

In FIG. 4, each row includes 650 Y-signal sample points, and these points are recorded on the portion of an NTSC-TV signal which corresponds to a horizontal available picture interval (53 μsec or less). Accordingly, a corresponding sampling frequency $f_s$ (refer to FIG. 3) is approximately 13 MHz or less. In the above-described manner, the Y signal having the band shown in FIG. 3 is recorded.

FIGS. 6(a) and 6(b) show two different recording patterns formed on the magnetic disk on the basis of the CHSV system. FIG. 6(a) shows the recording pattern formed when heads for two channels (2-ch heads) are utilized, while FIG. 6(b) shows the recording pattern formed when heads for four channels (4-ch heads) are utilized. (Needless to say, the 4-ch heads can be utilized to form either of the recording patterns shown in FIGS. 6(a) and 6(b).)

The recording pattern of FIG. 6(a) is formed in the following manner. First, the sample values of Y signals on rows $A_i$ and $B_i$ (i=a positive integer) are simultaneously recorded on first and second tracks, respectively, by means of the 2-ch heads. Then, the 2-ch heads are moved to third and fourth tracks (this movement is not needed when 4-ch heads are in use), and the sample values of Y signals on rows $D_i$ and $C_i$ are simultaneously recorded. In this process, to retain compatibility with conventional SV formats, the arrangement of the tracks on which the sample values of the Y signals on the rows $D_i$ and $C_i$ are recorded is reversed as shown in FIG. 6(a).

In general, if two tracks of signals are simultaneously recorded by using 2-ch heads, crosstalk arises between the signals during the recording operation of the two heads. However, with the above-described recording method, what is called H alignment can be implemented; that is to say, two kinds of signals are simultaneously recorded by the two heads with horizontal synchronization established between the recorded signals. Accordingly, deterioration of a reproduced image due to crosstalk does not easily occur in a reproducing operation.

If 4-ch heads are employed, the recording shown in FIG. 6(b) may be performed. More specifically, the sample values of the Y signals on the rows $A_i$ and $B_i$ are simultaneously recorded on the first and third tracks, respectively. Then, the sample values of the Y signals on the rows $C_i$ and $D_i$ are simultaneously recorded on the second and fourth tracks, respectively.

With the above-described recording method, in the case of the recording pattern of FIG. 6(a), it is possible to reproduce a frame image based on a conventional SV format from the second and third tracks. In the case of the recording pattern of FIG. 6(b), it is possible to reproduce a frame image based on the conventional SV format from the first and second tracks or the third and fourth tracks. A field image can also be reproduced from an arbitrary track.

The process of recording Y signals in the CHSV system is as described above.

The following is an explanation of the process of recording color-difference line-sequential (C) signals in the CHSV system.

FIGS. 7(a), 7(b) and 7(c) show the relationship between the recording sample patterns of a Y signal, a $C_R$ (=R−Y) signal and a $C_B$ (=B−Y) signal. In the conventional SV format, the recording band of a color-difference signal is approximately one sixth that of a Y signal, and the color-difference signal is recorded after being converted into a line-sequential signal. Accordingly, the sample patterns of the color-difference signals $C_R$ and $C_B$ recorded in the CHSV system are as shown in FIGS. 7(b) and 7(c), respectively. On the right-hand side of each of FIGS. 7(b) and 7(c), symbols $A_i$, $B_i$, $C_i$ and $D_i$ denote lines of Y signals to be recorded on identical tracks, respectively. Although the lines of Y signals do not completely coincide with the lines of corresponding C signals, this partial discrepancy is intended for compatibility with the SV format.

FIG. 8 is a table which shows the relationship between the recording positions of the Y and C signals. In the table, "FIRST STEP" indicates "simultaneous 2-ch recording executed in a first step," and "SECOND STEP" likewise indicates "simultaneous 2-ch recording executed in a second step." As described above, in the first step, recording on tracks 1 and 2 is executed and, in the second step, recording on tracks 3 and 4 is executed. Referring to FIG. 8, for example, in the first step, $Y(A_i)$ and $C_R(A_i)/C_B(A_i)$ are recorded on the track 1. $Y(A_i)$ indicates a Y signal consisting of a sequence of Y sample values on the line $A_i$ shown in FIG. 7(a) and $C_R(A_i)/C_B(A_i)$ indicates a color-difference line-sequential signal which starts with a $C_R$ signal and which is formed by the $C_R$ signal consisting of a sequence of $C_R$ sample values on the line $A_i$ shown in FIG. 7(b) and a $C_B$ signal consisting of a sequence of $C_B$ sample values on the line $B_i$ shown in FIG. 7(c). In FIG. 8, imaging-section outputs $Y_1$, $Y_2$, R, B are signals which are simultaneously outputted from the imaging section of a CHSV camera, which will be described later.

As described above, in the CHSV system, by combining offset sub-sampling and the analog transmission of sample values, information, the amount of which is apparently four times that of information transmitted by the conventional system, can be transmitted over a limited transmission space (twice that of an NTSC system).

Regarding the sampling of luminance signals in the CHSV camera in the above-described process, a luminance signal outputted from an image sensor may be passed through the LPF and sampled at a predetermined sampling rate. Such a sampling operation may also be implemented with the reading operation of the image sensor. If this is done, the hardware construction of the camera can be greatly simplified and highly accurate offset sampling can be achieved.

However, the aforesaid arrangement encounters the problem of the sampling frequency $f_{so}$ of the image sensor.

In general, if compatibility is to be retained with respect to various kinds of CHSV cameras or reproducing apparatus, the sampling frequency $f_{so}$ for sampling pixels needs to be fixed.

However, if the reading operation of the image sensor is utilized as a sampling operation, the sampling frequency $f_{so}$ is determined by the sampling rate of each individual solid-state image sensor. As a result, the sampling frequency $f_{so}$ will arbitrarily vary with the kind of image sensor used.

The above-described problem restricts the freedom of selection of solid-state image sensors. This restriction is serious when sensors developed for other kinds of devices are to be utilized.

SUMMARY OF THE INVENTION

It is, therefore, an object of the present invention to solve the above-described problems.

Another object of the present invention is to provide an image signal recording and reproducing system capable of recording and reproducing an image signal on and from a recording medium with the compatibility of the image signal retained irrespective of a sampling frequency.

To achieve the above-described objects, according to one aspect of the present invention, there is provided an image signal recording and reproducing system arranged to record an image signal on a recording medium and to reproduce a recorded image signal from the recording medium. The system is provided with sampling image signal generating means for generating a sampling image signal by executing sampling at a sampling frequency $f_{so}$, pilot signal generating means for generating a pilot signal having a frequency $f_r$, and recording means for recording information indicative of the values of M and N which satisfy $f_{so}/M = f_r/N$ (M and N: integers) on the recording medium together with the sampling image signal and the pilot signal.

Another object of the present invention is to provide an image signal recording and reproducing system in which an arbitrary type of solid-state image sensor can be used and which, therefore, has a high degree of freedom of design.

To achieve the above-described object, according to another aspect of the present invention, there is provided an image signal recording and reproducing system arranged to record an image signal on a recording medium and to reproduce a recorded image signal from the recording medium. The system is provided with sampling image signal generating means for generating a sampling image signal by executing sampling at a sampling frequency $f_{so}$, pilot signal generating means for generating a pilot signal having a frequency $f_r$, and recording means for recording either one of information indicative of the value of M which satisfies $f_{so} = M \cdot f_H$ (M: integer, $f_H$: horizontal synchronizing frequency) and information indicative of the value of $f_{so}$, on the recording medium together with the sampling image signal and the pilot signal.

Another object of the present invention is to provide an image signal recording and reproducing system capable of recording and reproducing a high-definition image signal on and from a recording medium with compatibility with conventional systems retained.

To achieve the above-described object, according to another aspect of the present invention, there is provided an image signal recording and reproducing system arranged to record an image signal on a recording medium and to reproduce a recorded image signal from the recording medium. The system is provided with sampling image signal generating means for generating a sampling image signal by executing sampling at a sampling frequency $f_{so}$, pilot signal generating means for generating a pilot signal having a frequency $f_{ID} = n \cdot f_H$ (n: integer, $f_H$: horizontal synchronizing frequency), and recording means for recording information indicative of the values of M and N which satisfy $f_{so}/M = f_{ID}/N$ (M and N: integers) on the recording medium together with the sampling image signal and the pilot signal.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 1 is a schematic view which serves to illustrate analog transmission of sample values;

FIGS. 2(a) to 2(f) are waveform diagrams which serve to illustrate the concept of analog transmission of sample values;

FIG. 8 is a table showing the recording steps executed in a CHSV system;

FIG. 14(a) is a block diagram schematically showing the arrangement Of the reproducing apparatus of the CHSV system according to the first embodiment of the present invention;

FIG. 16(a) is a block diagram schematically showing the arrangement of the reproducing apparatus of a CHSV system according to a second embodiment of the present invention;

FIG. 18(a) is a block diagram schematically showing the arrangement of the reproducing apparatus of the CHSV system according to the third embodiment of the present invention.

DETAILED DESCRIPTION OF THE PREFERRED EMBODIMENTS

Preferred embodiments of the present invention will be described below with reference to the accompanying drawings.

Initially, the arrangement of a CHSV camera (a system constituted by an imaging section and a recording section) will be described.

Figure 9:
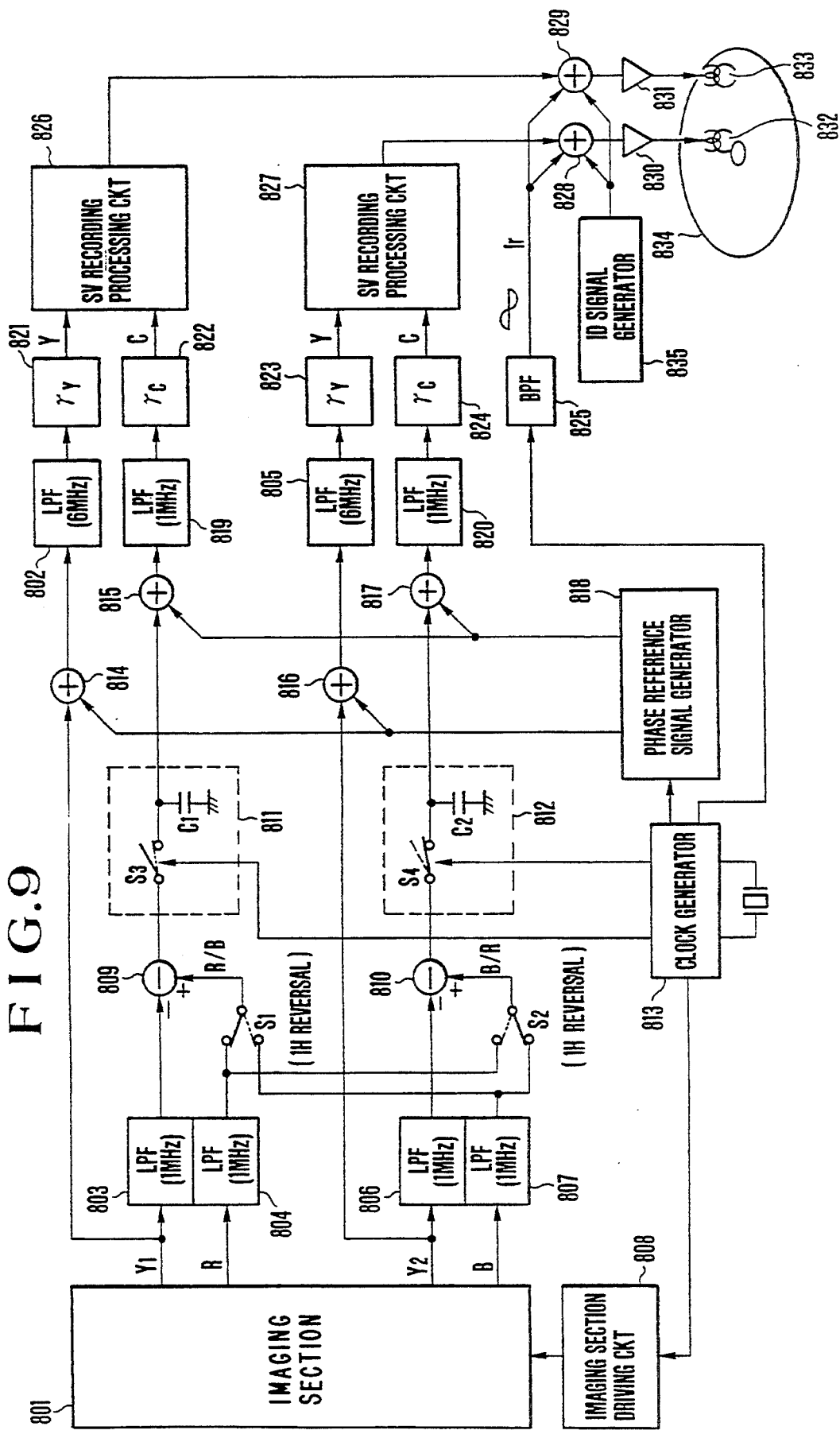
FIG. 9 is a block diagram schematically showing the arrangement of the recording apparatus of a CHSV system according to a first embodiment of the present invention.

FIG. 9 is a block diagram schematically showing the arrangement of the CHSV camera.

Figure 3:
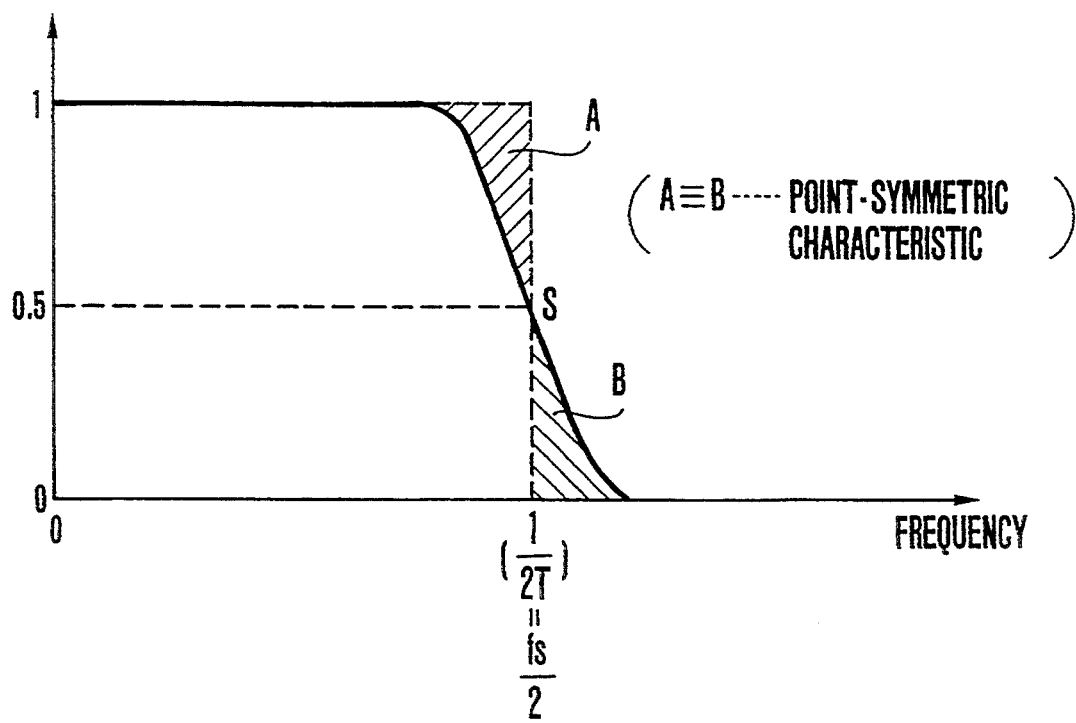
FIG. 3 is a chart showing the transmission-path LPF characteristic of analog transmission of sample values.
Figure 4:
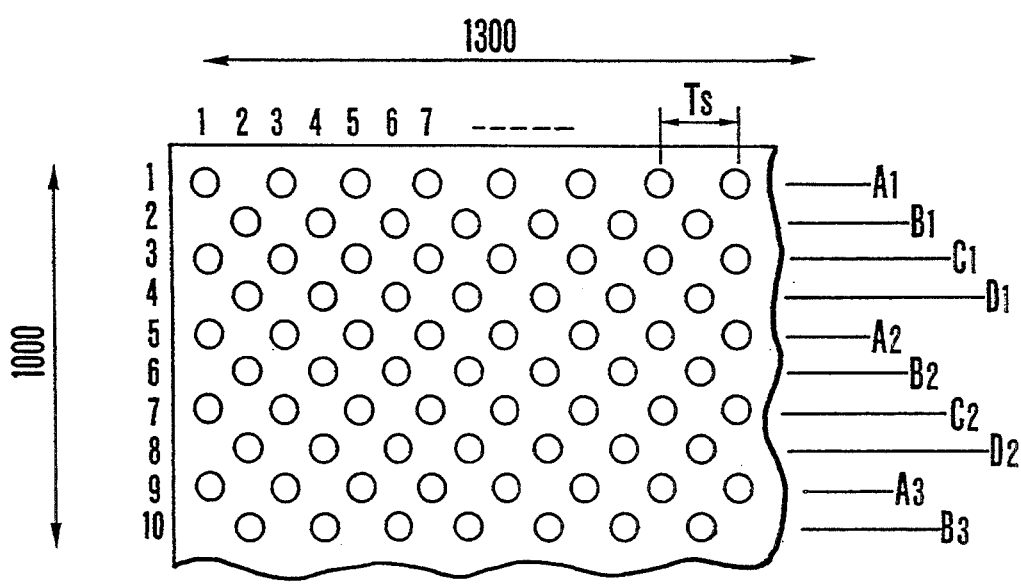
FIG. 4 is a partial schematic view showing the sample pattern of a Y signal.
Figure 5:
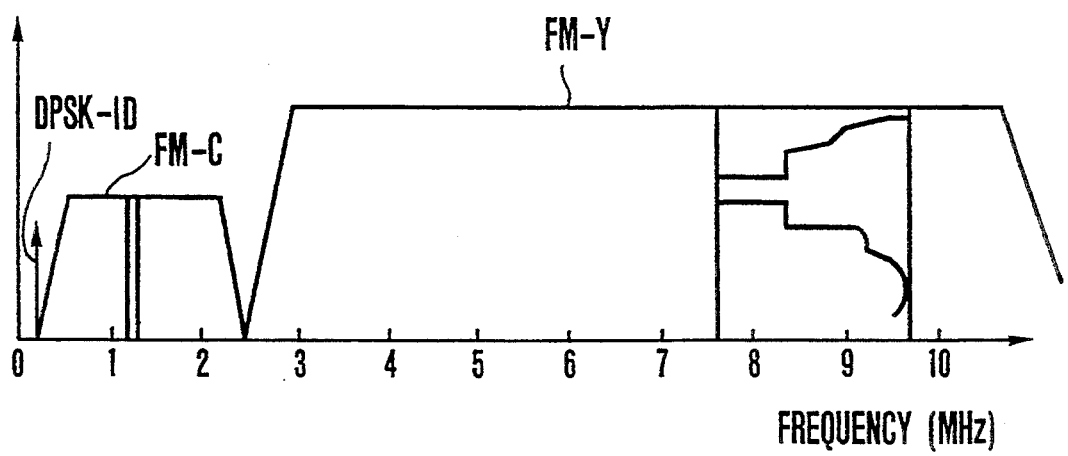
FIG. 5 is a diagram showing the frequency allocation of a signal recorded in an SV format.

The CHSV camera shown in FIG. 9 is, as described above, arranged to record image signals for one picture by continuously performing simultaneous 2-ch recording twice. In the first step described in conjunction with FIG. 8, SV recording processing circuits 826 and 827 respectively receive Y and C signals and apply predetermined processes, such as emphasis and frequency modulation, to the input Y and C signals. Each of the SV recording processing circuits 826 and 827 frequency-multiplexes the thus-processed Y and C signals and outputs the frequency-multiplexed signal. Adders 828 and 829 add the output signals of the corresponding SV recording processing circuits 826 and 827 to both an ID signal outputted from an ID signal generator 835 and a pilot signal $f_r$ of sinusoidal waveform which is obtained by passing a clock signal generated by a clock generator 813 through a band-pass filter (BPF) 825. The pilot signal $f_r$ serves as a reference signal for TBC (time base correction) during reproduction and has a frequency near 2.5 MHz which corresponds to a gap between FM-Y and FM-C as shown in FIG. 5. The signals outputted from the adders 828 and 829 are amplified by recording amplifiers 830 and 831, respectively. The resulting signals for two channels are simultaneously recorded on predetermined tracks of a magnetic disk 834 by 2-ch heads 832 and 833, respectively. In the second step, after the 2-ch heads 832 and 833 have been moved, recording is performed in a manner similar to that of the above-described first step.

The imaging section 801 shown in FIG. 9 is explained below.

Figure 10:
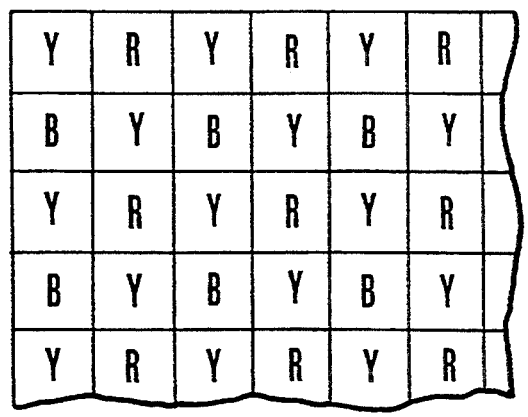
FIG. 10 is a partial schematic view showing the arrangement of the color filter assembly used in the embodiment shown in FIG. 9.

FIG. 10 is a partial schematic view showing the arrangement of a color filter assembly for use with a single solid-state image sensor which constitutes the imaging section 801. As shown in FIG. 10, the color filter assembly consists of Y (luminance) filters which are arranged in checkered form and the remaining R and B filters which are arranged in line-sequential form.

Figure 11:
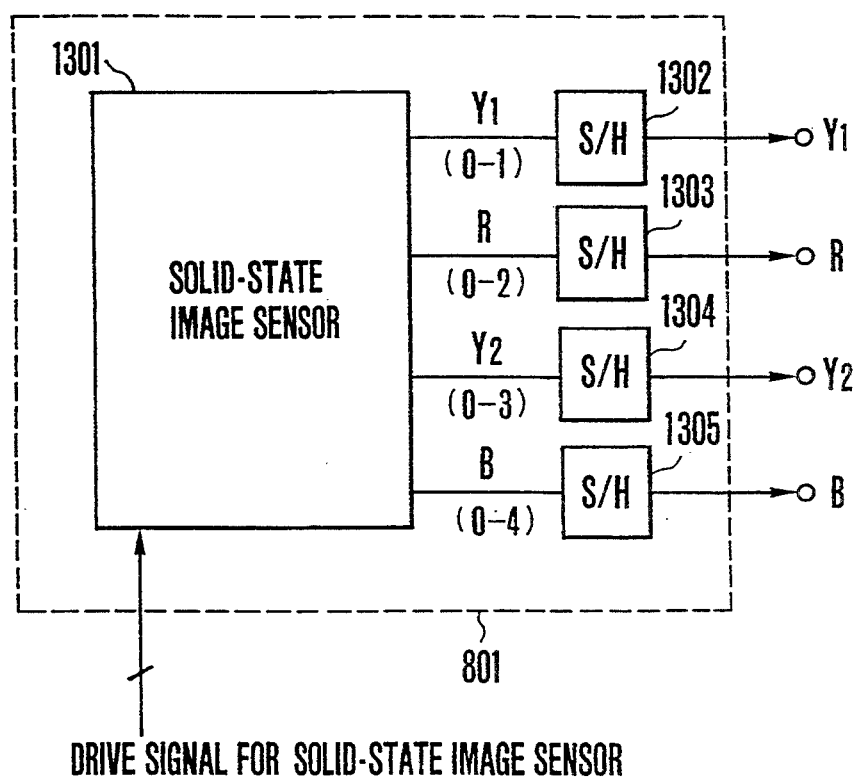
FIG. 11 is a block diagram schematically showing the arrangement of the imaging section used in the embodiment shown in FIG. 9.

FIG. 11 is a view showing an example of the arrangement of the imaging section 801 which includes a solid-state imaging device provided with the color filter assembly shown in FIG. 10.

Referring to FIG. 11, the imaging section 801 includes a solid-state image sensor 1301 having the color filter assembly shown in FIG. 10 and sample-and-hold circuits 1302–1305. The solid-state image sensor 1301 has approximately 1300×1000 pixels and is arranged so that signals for two adjacent horizontal lines can be read out at the same time every other two lines.

In FIG. 11, among the simultaneously read signals for two lines, the Y signal ($Y_1$) of the upper line is outputted onto a signal line 0-1, the Y signal ($Y_2$) of the lower line onto a signal line 0-3, an R signal onto a signal line 0-2, and a B signal onto a signal line 0-4.

The sample-and-hold circuits 1302 to 1305 sample, hold and output the Y signal ($Y_1$), the Y signal ($Y_2$), the R signal and the B signal at predetermined timings.

Figure 12:
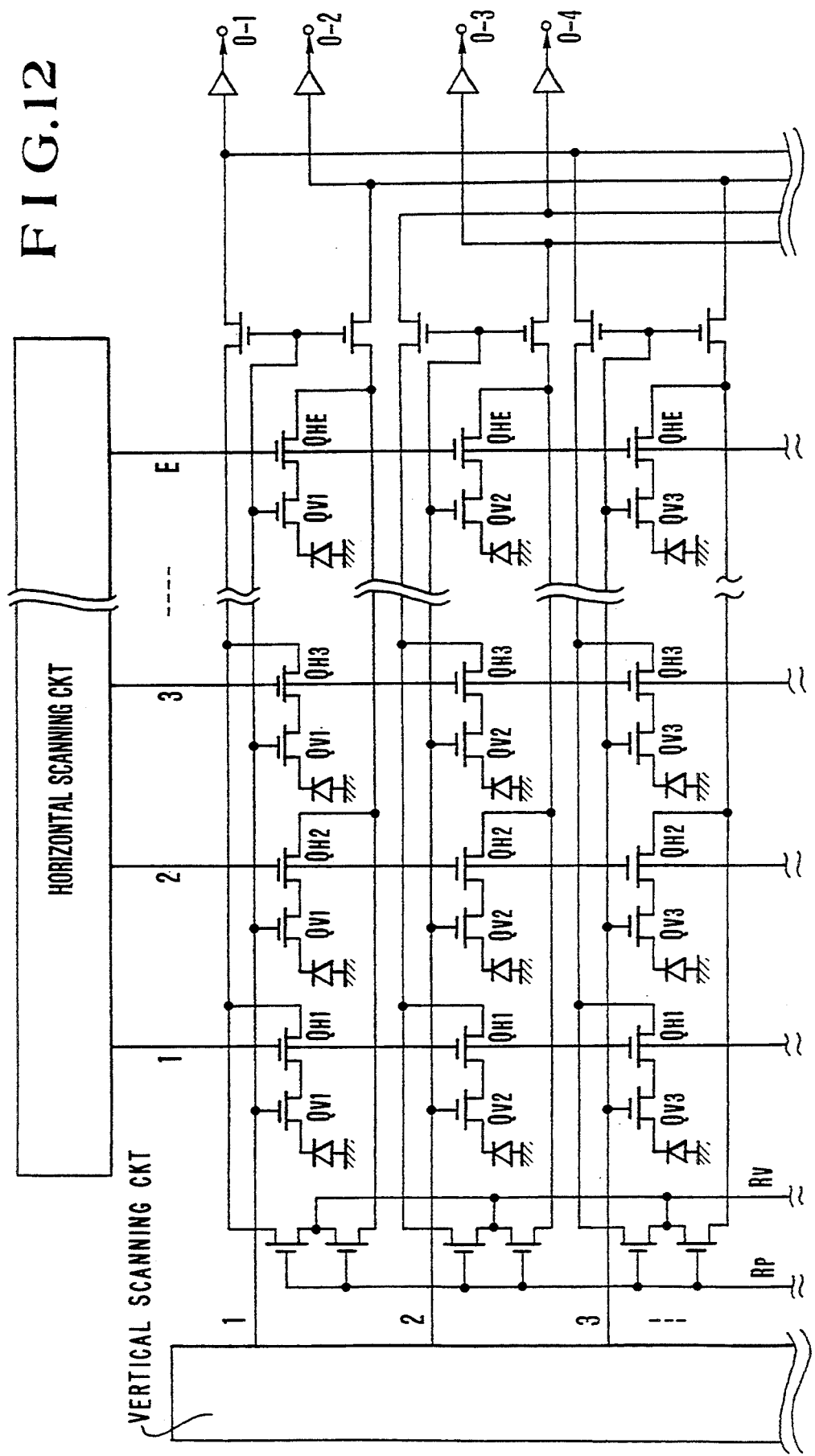
FIG. 12 is a schematic circuit diagram showing the arrangement of a MOS-type solid-state image sensor.

FIG. 12 is a schematic view showing a specific example of a solid-state image sensor having the aforesaid arrangement capable of simultaneously reading signals for two adjacent horizontal lines every other two lines, and the illustrated solid-state image sensor is a MOS type solid-state image sensor.

The MOS type solid-state image sensor of FIG. 12 is of a TSL (transversal signal line) type which is well known.

If the MOS type solid-state image sensor shown in FIG. 12 is combined with a CHSV system, since signals are read out in horizontal order, it is possible to provide the effect of suppressing smear or the like.

Since the MOS type solid-state image sensor adopts a signal-reading operation of the X-Y address type, it is possible to simultaneously read two lines of signals as described above. For the sake of simplicity, no detailed description is given of such a signal-reading operation.

The following is an explanation, referring to FIG. 9, of the signal processing executed from the time the imaging section 801 is driven to output the $Y_1$, $Y_2$, R and B signals by an imaging-section driving circuit 808 in synchronization with a synchronizing signal outputted from a clock generator 813 until those signals are inputted to the SV recording processing circuits 826 and 827. The signal processing associated with Y and C signals are separately explained in that order.

Figure 13:
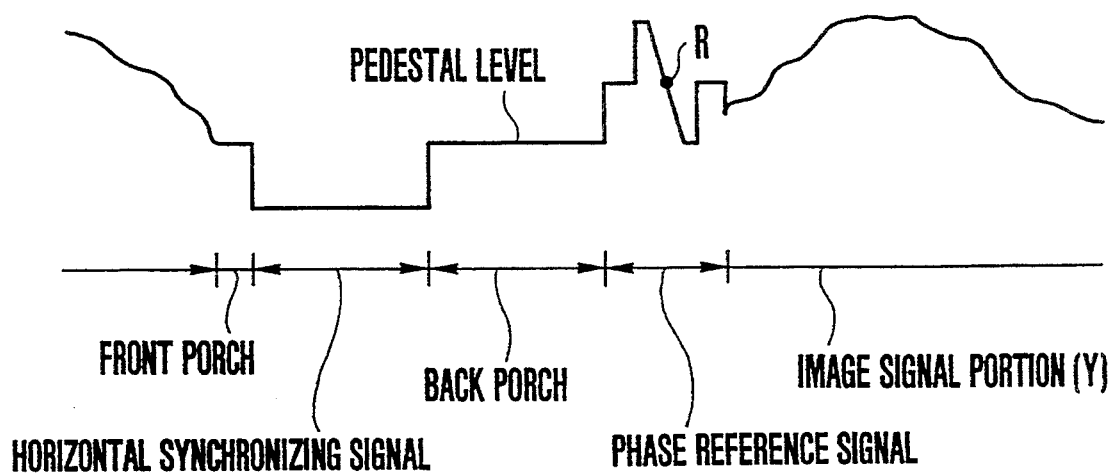
FIG. 13 is a waveform diagram of a Y signal obtained after a phase reference signal has been added thereto.

Initially, signal processing for the Y signal is explained. The $Y_1$ and $Y_2$ signals outputted from the imaging section 801 (refer to FIG. 8 for the details of $Y_1$ and $Y_2$) are supplied to adders 814 and 816, respectively. The adders 814 and 816 add, to the respective $Y_1$ and $Y_2$ signals, phase reference signals outputted from a phase reference signal generator 818. Such phase reference signals provide a phase reference for re-sampling operation during reproduction, as will be explained later. One phase reference signal may be inserted every 1H period (H: horizontal synchronizing period) or every 1V period (V: vertical synchronizing period). FIG. 13 shows an example in which one phase reference signal is inserted every 1H period. As shown in FIG. 13, the phase reference signal is a three-level signal and R indicates a phase reference point.

The $Y_1$ and $Y_2$ signals, to which such phase reference signals have been added by the respective adders 814 and 816, are passed through corresponding low-pass filters (LPFs) 802 and 805 each of which has a pass frequency band of 6 MHz. The signals outputted from the LPFs 802 and 805 are respectively inputted to the SV recording processing circuits 826 and 827 through gamma correction circuits ($\gamma Y$) 821 and 823.

The gamma correction circuits ($\gamma Y$) 821 and 823 serve as transmission-path gamma correction circuits and are inserted for the purposes of improving the S/N ratio of a dark portion of a luminance signal, assuring compatibility with conventional SV formats, and the like.

Then, signal processing for the C signal is explained. The R and B signals outputted from the imaging section 801 (refer to FIG. 8 for the details of R and B) are respectively passed through LPFs 804 and 807, each of which has a pass frequency band of 1 MHz, and are inputted to switching circuits $S_1$ and $S_2$. The switching circuits $S_1$ and $S_2$ operate to switch every 1H period, thereby providing color line-sequential signals R/B (output from $S_1$) and B/R (output from $S_2$).

A subtracter 809 subtracts the signal $Y_1$ outputted from an LPF 803 having a pass frequency band of 1 MHz from the output signal of the switching circuit $S_1$, while a subtracter 810 subtracts the signal $Y_2$ outputted from an LPF 806 having a pass frequency band of 1 MHz from the output signal of the switching circuit $S_2$. A color-difference line-sequential signal $C_R/C_B$ is outputted from the subtracter 809 and a color-difference line-sequential signal $C_B/C_R$ from the subtracter 810.

Figure 7:
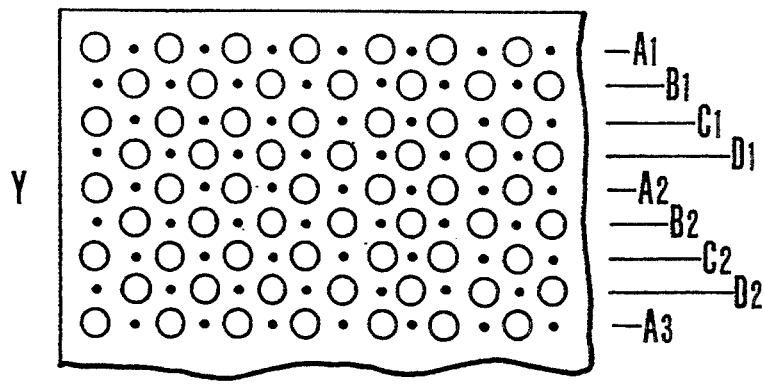
FIGS. 7(a), 7(b) and 7(c) are views showing the recording sampling patterns of Y, $C_R$ and $C_B$ signals, respectively.
Figure 7:
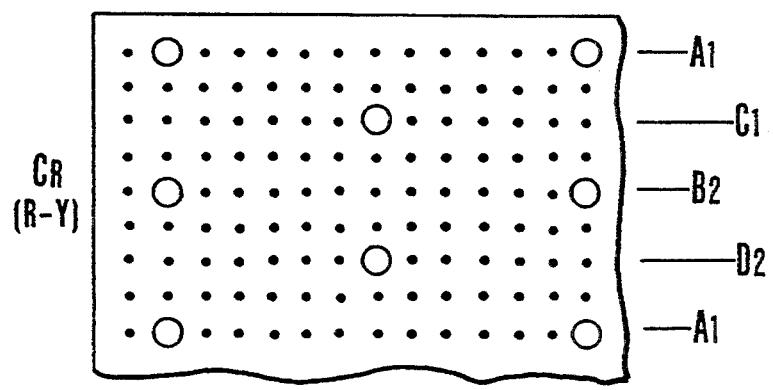
Figure 7:
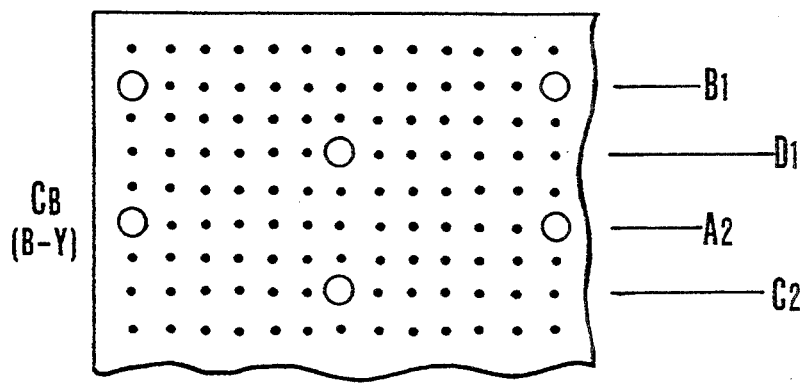

The color-difference line-sequential signals $C_R/C_B$ and $C_B/C_R$ are sampled by respective sample-and-hold circuits 811 and 812 so as to form the sample patterns $C_R$ and $C_B$ shown in FIGS. 7(b) and 7(c). The sampled signals are supplied to adders 815 and 817. Sampling clocks for this sampling operation are supplied from the clock generator 813.

In the respective adders 815 and 817, phase reference signals are added to the sampled signals as in the case of the Y signal. (In this case, a phase reference point for the C signal may not coincide with the phase reference point for the Y signal.)

The signals outputted from the adders 815 and 817 are inputted to the SV recording processing circuits 826 and 827 through LPFs 819 and 820 and gamma correction circuits ($\gamma$c) 822 and 824, respectively.

Subsequently, as described above, the TBC reference signal $f_r$ and the ID signal generated by the ID signal generator 835 are added in each of the adders 828 and 829, and are recorded on the recording medium 834 by the corresponding 2-ch heads 832 and 833. Incidentally, the ID signal is a signal obtained by modulating a carrier signal 13$f_H$ in accordance with digital data by differential phase-shift keying (DPSK), and conforms to a conventional SV format.

In the first embodiment, the relationship between the sampling frequency $f_{so}$ of the solid-state image sensor used in the recording apparatus shown in FIG. 9 and the frequency $f_r$ of a pilot signal is represented as $f_{so} = (M/N) f_r$. The values of M and N are multiplexed with an image signal by utilizing the user's area of the ID signal, and are recorded on a magnetic disk which serves as a recording medium.

For example, if the values of M and N are set to M=5 and N=1, respectively, and the sampling frequency $f_{so}$ of the image sensor is set to $f_{so}$=12.5 MHz, the frequency $f_r$ of the pilot signal serving as a TBC reference signal becomes $f_r$=12.5/5=2.5 MHz. Therefore, the frequency $f_r$ of the pilot signal can be positioned between the bands of the FM-Y and FM-C signals shown in FIG. 5 described above.

In a reproducing apparatus which will be described later, the sampling frequency $f_{so}$ is restored on the basis of the pilot signal and the values of M and N, and an image signal reproduced from the magnetic disk is re-sampled at the sampling frequency $f_{so}$, whereby the original image signal is restored.

The arrangement of a CHSV reproducing apparatus according to the first embodiment will be described below.

FIG. 14(a) is a block diagram showing the arrangement of the CHSV reproducing apparatus.

The signal reproduced from a magnetic disk 1501 by a magnetic head 1502 is inputted via a pre-amplifier 1503 to both an SV reproduction processing circuit 1504 and an LPF 1530.

The SV reproduction processing circuit 1504 performs frequency-separation of FM-Y and FM-C signals (refer to FIG. 5) from the input reproduced signal, then applies frequency demodulation, de-emphasis and the like to each of the signals, and then outputs a reproduced Y signal and a reproduced C signal.

Reverse gamma correction circuits ($\gamma Y^{-1}$) 1506 and ($\gamma C^{-1}$) 1507, which follow the SV reproduction processing circuit 1504, are provided for restoring, to the original signals, from signals which were respectively subjected to transmission-path $\gamma Y$ and $\gamma C$ correction during recording. The Y signal is corrected by the reverse gamma correction circuit ($\gamma Y^{-1}$) 1506 and inputted to an A/D converter 1513 via an LPF 1508, while the C signal is corrected by the reverse gamma correction circuit ($\gamma C^{-1}$) 1507 and inputted to a variable delay circuit 1528 via an LPF 1509.

The following is an explanation of a process for generating re-sampling clocks during reproduction.

A pilot signal $f_r$ which is separated from a reproduced signal by an automatic optimizing circuit 1532 which will be described later, is inputted to a programmable PLL (phase-locked loop) circuit 1533 which will be described later. The programmable PLL circuit 1533 generates and outputs a clock $f_{so}$ which is phase-synchronized with the signal $f_r$ and which has a frequency equal to the frequency of a re-sampling clock for a Y signal.

Figure 15:
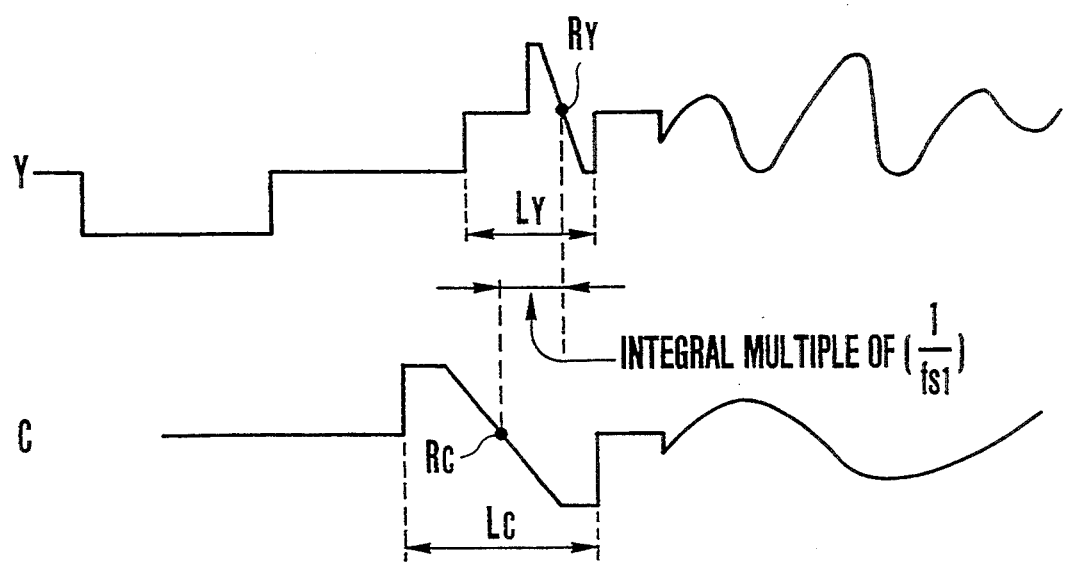
FIG. 15 is a view showing the relationship between phase reference signals for Y and C signals.

A phase control circuit 1511 for a Y-signal re-sampling clock executes phase control of the re-sampling clock $f_{so}$ thus obtained, thereby outputting a Y-signal re-sampling clock $f_{s1}$, the phase of which has, as shown in FIG. 15, a predetermined relationship to the phase reference point of the aforesaid Y-signal re-sampling phase reference signal added to the reproduced Y signal.

A clock ($f_{s1}/6$) is used as a re-sampling clock for a C signal. The clock ($f_{s1}/6$) is obtained by dividing the frequency of the aforesaid clock $f_{s1}$ by six in a ÷6 frequency divider 1527. The ÷6 frequency divider 1527 is arranged to be reset in response to the falling edge of a synchronizing signal. The C signal outputted from an LPF 1509 is delay-controlled by the variable delay circuit 1528 whose delay time is controlled by a C-signal delay control signal generating circuit 1529, whereby the phase relationship between the C-signal re-sampling clock ($f_{s1}/6$) and the re-sampling phase reference point added to the C signal is rendered constant. The C signal thus processed is supplied to an A/D converter 1514.

The respective A/D converters 1513 and 1514 of FIG. 14(a) perform A/D conversion of the Y signal and the C signal by utilizing, as clocks, the thus-generated re-sampling clocks. The A/D-converted Y signal and C signals are written into an image memory 1515. Write addresses associated with the image memory 1515 are generated by an address generator 1517.

Figure 6A:
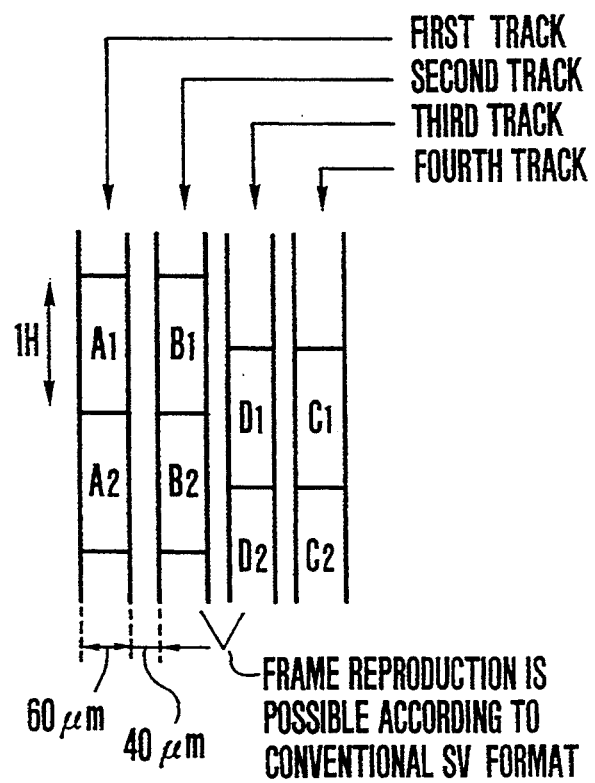
FIGS. 6(a) and 6(b) are schematic views showing different recording track patterns formed in a CHSV system.
Figure 6B:
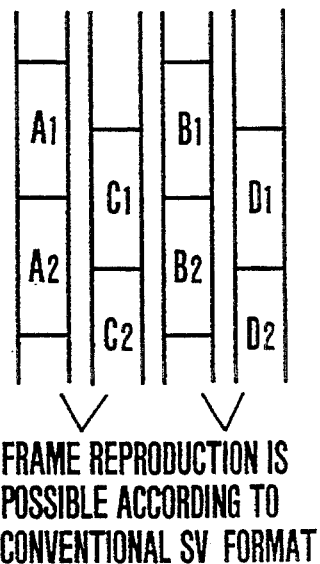

The CHSV reproducing apparatus shown in FIG. 14(a) repeats the aforesaid reproduction operation for all the four tracks (the first to fourth tracks) shown in FIGS. 6(a) and 6(b), thereby storing all the sample values, recorded on the four tracks of the magnetic disk 1501, in the image memory 1515 shown in FIG. 14(a).

Thereafter, an image processing circuit 1516 executes processing, such as interpolation and rearrangement of C-signal data, by using the sample-value data stored in the image memory 1515. The image processing circuit 1516 executes LPF processing for extracting the low-band component of a two-dimensional spatial frequency through a two-dimensional digital filter, thereby providing a low-band component $Y_L$. The image processing circuit 1516 then performs arithmetic operations of $(Y-Y_L)$ to provide the high-band component $Y_H$ of the sample-value data of the Y signal. Accordingly, four kinds of data $Y_H$, $Y_L$, $C_R$ and $C_B$ are stored in the image memory 1515.

After the above-described processing has been completed, the respective kinds of data are read from the image memory 1515 in predetermined order at a predetermined clock rate in accordance with the read addresses specified by the address generator 1517.

Among the $Y_H$, $Y_L$, $C_R$ and $C_B$ signals read from the image memory 1515, the $Y_L$, $C_R$ and $C_B$ signals are converted into $R_L$, $G_L$ and $B_L$ signals by a matrix circuit 1519. The $R_L$, $G_L$ and $B_L$ signals are added to $Y_H$ by adders 1520, 1521 and 1522, respectively. The adders 1520, 1521 and 1522 output a (RL+YH) signal, a (GL+YH) signal and a (BL+YH) signal.

The respective signals outputted from the adders 1520, 1521 and 1522 are converted into analog signals by corresponding D/A converters 1523, 1524 and 1525, and are outputted as individual R, G and B signals.

The ID signal multiplexed with the reproduced signal is separated by the LPF 1530 and decoded by an ID decoder 1531.

The automatic optimizing circuit 1532 will now be described with reference to FIG. 14(b).

In the first embodiment, the frequency of the pilot signal $f_r$ does not always show a constant value.

In general, it is necessary to supply a pilot signal having a sufficient S/N ratio to the programmable PLL circuit 1533. If the pilot signal $f_r$ has a fixed frequency, it will suffice to pass it through a BPF having a narrow pass frequency band. However, since the frequency of the pilot signal $f_r$ has no fixed value as described above, such a BPF cannot be used. To overcome the problem, the automatic optimizing circuit 1532 is used to find an optimum frequency within a frequency range of the order of 2.5+0.5 MHz to 2.5−0.1 MHz, and the corresponding frequency may be extracted from a reproduced signal. This is because the frequency of the pilot signal $f_r$ is commonly selected to lie inside such a range in order to insert the pilot signal $f_r$ into an intermediate band between the frequency bands FM-Y and FM-C shown in FIG. 5.

Figure 14B:
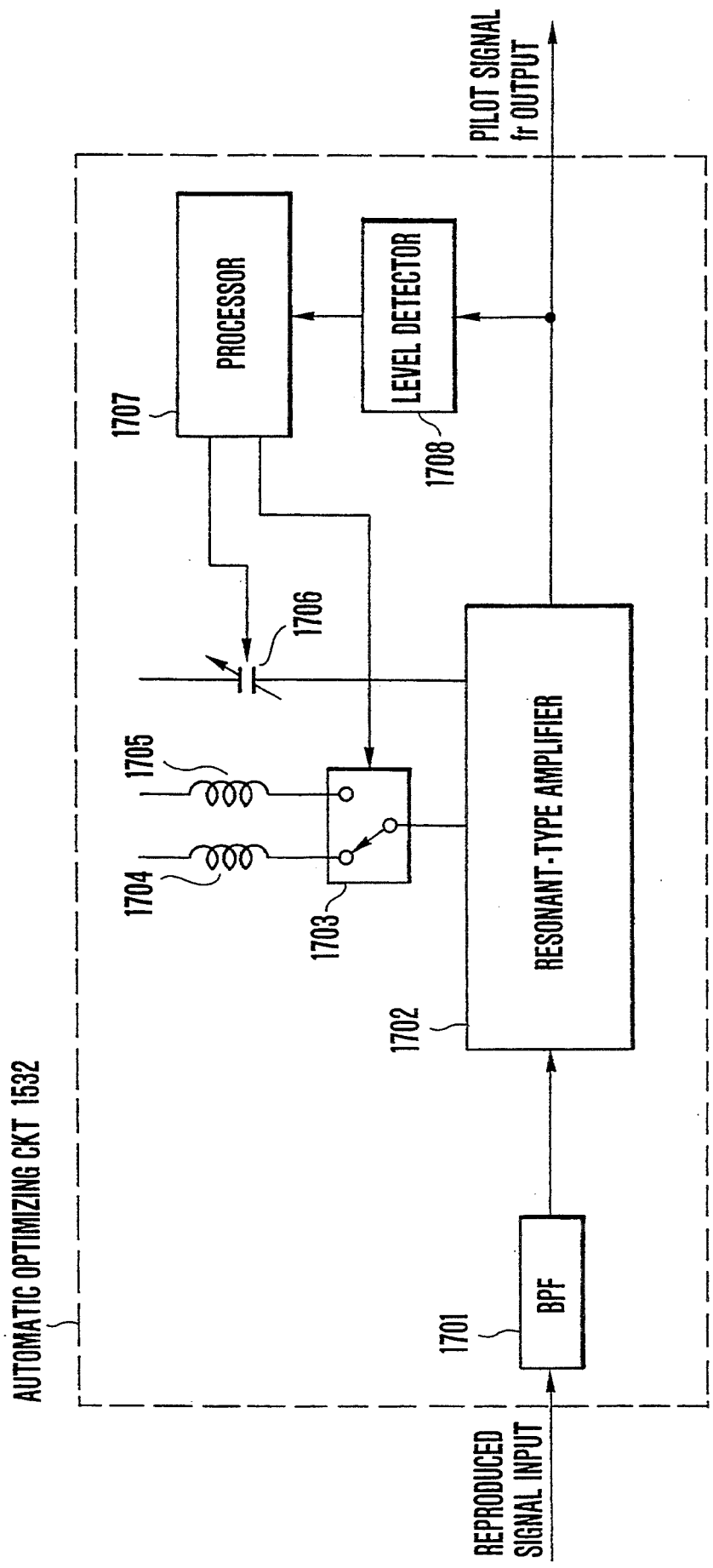
FIG. 14(b) is a detailed block diagram showing the arrangement of the automatic optimizing circuit shown in FIG. 14(a)

Referring to FIG. 14(b), a reproduced signal, which is reproduced from the magnetic disk 1501 by the magnetic head 1502 and amplified by a pre-amplifier 1503, is supplied to a BPF 1701 having a pass band of the order of 2.4 to 3 MHz, which is disposed in the automatic optimizing circuit 1532. The BPF 1701 separates a signal containing the pilot signal $f_r$ and supplies it to a resonant-type amplifier 1702. The output signal of the resonant-type amplifier 1702 is supplied to a level detector 1708. The level detector 1708 detects the level of the supplied signal and supplies level information to a processor 1707.

The processor 1707 sets the resonance point of the resonant-type amplifier 1702 in accordance with the level information supplied from the level detector 1708. More specifically, the processor 1707 controls a variable capacitor 1706 and the connection of a switch 1703 to select either one of coils 1704 and 1705 having different values, thereby automatically adjusting the resonance frequency of the resonant-type amplifier 1702 to select a resonance frequency at which the level of the signal outputted from the resonant-type amplifier 1702 reaches its highest value.

In this manner, the pilot signal $f_r$ generated from the magnetic disk 1501 is optimized to be a signal having a sufficient S/N ratio by the automatic optimizing circuit 1532.

The operation of the programmable PLL circuit 1533 will be described below with reference to FIG. 14(c).

The pilot signal $f_r$ outputted from the automatic optimizing circuit 1533 is frequency-divided by a first programmable frequency divider 1606, and is then supplied to a phase comparator 1601. The output of the phase comparator 1601 is passed through a loop filter 1602 and supplied to a programmable VCO (voltage-controlled oscillator) 1603. The output from the programmable VCO 1603 is frequency-divided by a second programmable frequency divider 1604 and supplied to the phase comparator 1601. The dividing ratio of the first frequency divider 1606 to the second frequency divider 1604 is determined by the processor 1605 on the basis of data indicative of the values of M and N which are decoded and supplied by the ID decoder 1531. If the values of M and N are set to M=5 and N=1 as described above, the dividing ratios of the first and second programmable frequency dividers 1606 and 1604 are set to "1" and "5" respectively Each of the programmable frequency dividers 1604 and 1606 is comprised of a counter, and their dividing ratios can be easily set by changing the counts of the respective counters in accordance with an instruction supplied from the processor 1605.

The frequency $f_{so}$ of a sampling clock signal which is outputted from the programmable VCO 1603 varies with the frequency of the pilot signal $f_r$ and the values of M and N. The processor 1605 calculates the center frequency $f_{so}'$ of the programmable VCO 1603 on the basis of both the frequency of the pilot signal $f_r$, which is outputted from the automatic optimizing circuit 1532 and is detected by a frequency detector 1607, and the data indicative of the values of M and N supplied from the ID decoder 1531. In order to cause the programmable VCO 1603 to oscillate at the center frequency $f_{so}'$ of the programmable VCO 1603, the processor 1605 sets the oscillation frequency $f_{so}'$ of the programmable VCO 1603 by switching the values of the inductance or capacitance of an oscillating inductance-capacitance circuit of the VCO 1603, by changing the value of the capacitance by varying the center voltage of a variable capacitor, or by appropriately combining the switching and changing operations.

Accordingly, the programmable PLL circuit 1533 outputs the sampling frequency signal $f_{so}$ which corresponds to jitters occurring in the reproduced signal.

In the above-described manner, the programmable PLL circuit 1533 forms the sampling frequency $f_{so}$ phase-synchronized with the pilot signal $f_r$ which is extracted by the automatic optimizing circuit 1532 from the signal reproduced from the magnetic disk 1501. The subsequent operations are as described previously in connection with FIG. 14(a).

As described above, according to the first embodiment, the frequency $f_r$ of the pilot signal is selected to be:

$$f_r = (N/M)f_{so}$$

and the values of M and N are recorded together with an image signal and a pilot signal during recording, while, during reproduction, the sampling frequency signal $f_{so}$ for reproduction, which corresponds to the recorded signal, is formed from the values of M and N and the pilot signal $f_r$. Accordingly, in the case of an arrangement in which offset sampling is carried out by means of a solid-state image sensor during recording, even if the value of $f_{so}$ for recording varies with the kind of solid-state image sensor used, it is possible to conduct re-sampling for reproduction at a correct sampling frequency $f_{so}$. Accordingly, the freedom of selection of the sampling frequency $f_{so}$ increases, whereby a desired CHSV system can be constructed by utilizing various kinds of solid-state image sensors and it is also possible to advantageously retain compatibility with various other systems.

Although, in the first embodiment, the pilot signal $f_r$ is multiplexed with an image signal so that they can be recorded in succession, the pilot signal fr may be multiplexed with at least either one of the horizontal and vertical blanking portions of the image signal. In this case, if the frequency of the pilot signal fr is not strictly selected, noise such as moiré, does not occur in the image signal, whereby the freedom of selection of the frequency of the pilot signal fr increases.

Figure 14C:
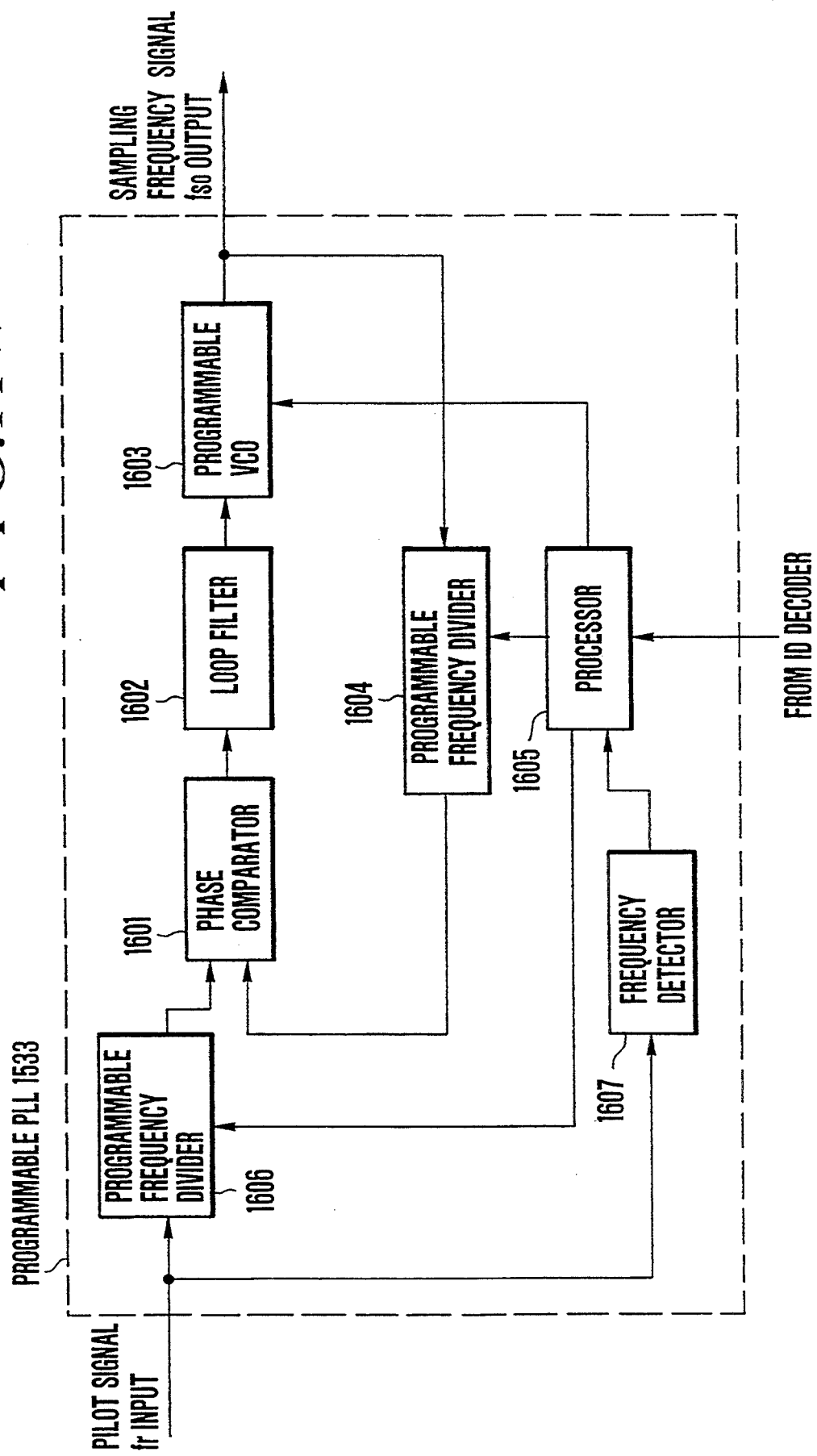
FIG. 14(c) is a detailed block diagram showing the arrangement of the programmable PLL circuit shown in FIG. 14(a)

In the above-described case, if the sampling signal fso phase-synchronized with the pilot signal fr is to be formed by the PLL circuit on the reproduction side, the output signal of the phase comparator 1601 of FIG. 14(c) may be held by a sample-and-hold circuit or the like during the interval in which no pilot signal is obtained.

Although, in the above-described embodiment, the values of M and N are recorded with an image signal and a pilot signal, information indicative of the sampling frequency fso and the frequency of the pilot signal fr may be recorded with the image signal and the pilot signal.

A second embodiment of the present invention will now be described.

In the second embodiment, the sampling frequency fso of the solid-state image sensor used in a recording apparatus (not shown) is given by:

$$f_{so} = M \cdot f_H$$

where
fH: horizontal synchronizing frequency, and
M: a positive integer.
The pilot frequency fr of a pilot signal is given by:

$$f_r = N \cdot f_H$$

where N: predetermined positive integer. The value of M is multiplexed with an image signal by utilizing the user's area of an ID signal, and is recorded on a magnetic disk which serves as a recording medium.

In a reproducing apparatus, the sampling frequency fso is restored on the basis of the aforesaid pilot signal and the value of M, and an image signal reproduced from the magnetic disk is re-sampled by using the sampling frequency fso to restore the original image signal.

The following is an explanation of a reproducing apparatus of a CHSV system according to the second embodiment of the present invention.

FIG. 16(a) is a block diagram schematically showing the arrangement of the reproducing apparatus of the CHSV system according to the second embodiment of the present invention. In FIG. 16(a), like reference numerals are used to denote the like or corresponding elements shown in FIG. 14(a) and detailed description is omitted.

Figure 16B:
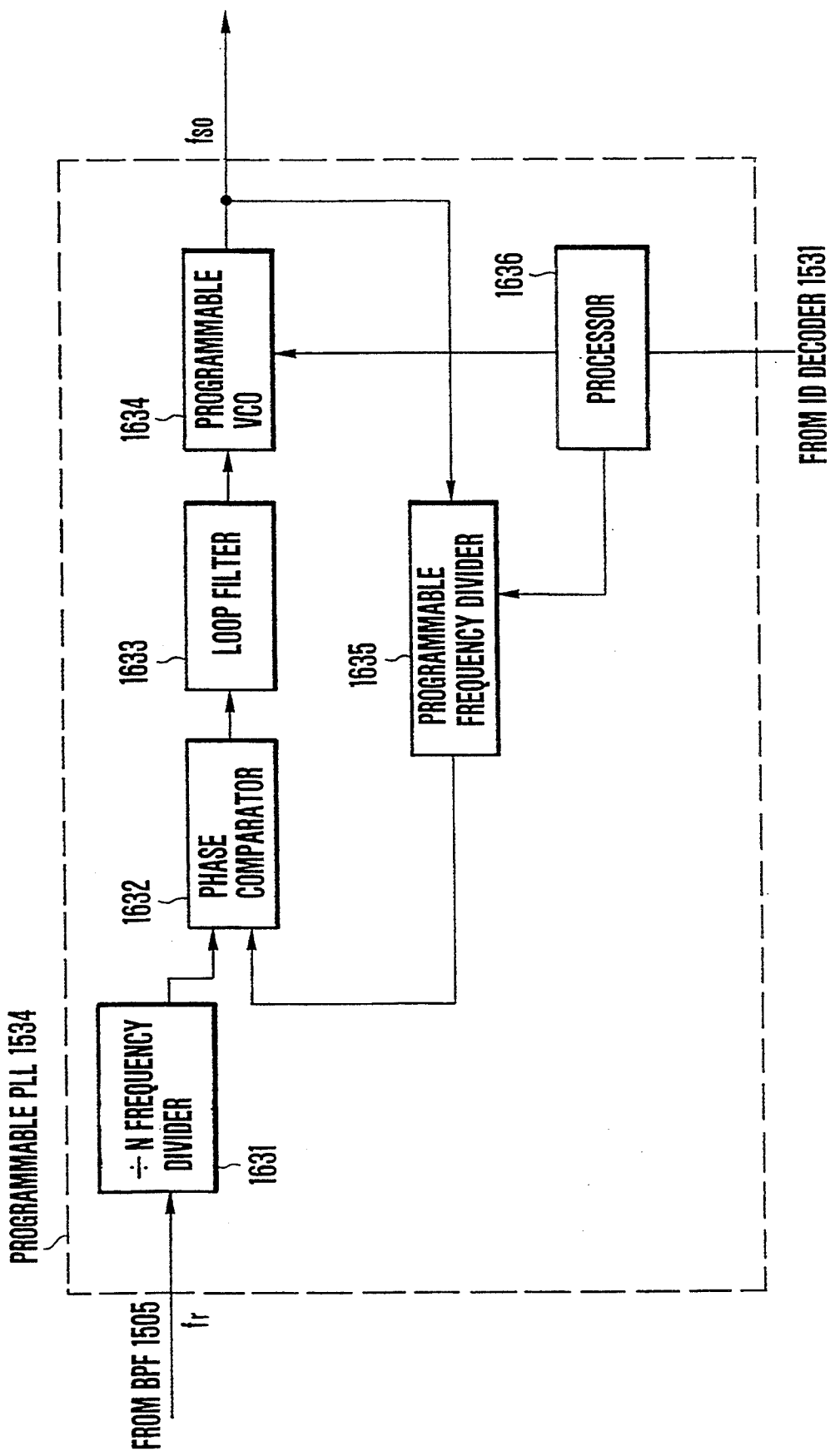
FIG. 16(b) is a detailed block diagram showing the arrangement of the programmable PLL circuit shown in FIG. 16(a)

FIG. 16(b) is a detailed block diagram showing the arrangement of a programmable PLL circuit 1534 used in the embodiment shown in FIG. 16(a).

Referring to FIGS. 16(a) and 16(b), a pilot signal fr, which is separated from a reproduced signal by a BPF 1505, is inputted to the ÷N frequency divider 1631 shown in FIG. 16(b). After the frequency of the pilot signal fr is divided by N, the result is inputted to a phase comparator 1632. Data indicative of the value of M, decode by the ID decoder 1531, is inputted to a processor 1636. On the basis of the input data indicative of the value of M, the processor 1636 controls a programmable VCO 1634 so that the center frequency thereof sufficiently approximates approaches MfH, I.e. the sampling frequency fso. The output of the programmable VCO 1634 is inputted to a programmable frequency divider 1635. The control may be implemented, for example, by switching the value of the inductance of an oscillating inductor or that of the capacitance of an oscillating capacitor, by changing the value of the capacitance by shifting the center voltage of a variable capacitor, or by appropriately combining the switching and changing operations. The processor 1636 controls the programmable frequency divider 1635 to set the dividing ratio thereof to M. The programmable frequency divider 1635 is comprised of a counter, and the dividing ratio can be easily controlled by changing the count of the counter in accordance with an instruction supplied from the processor 1636. The programmable frequency divider 1635 divides by M the frequency of the signal outputted from the programmable VCO 1634, and the output of the programmable frequency divider 1635 is inputted to the phase comparator 1632. In this manner, the sampling frequency signal fso represented as fso=M·fH is formed.

Since the subsequent operation is the same as explained in connection with FIG. 14(a), explanation is omitted.

As described above, in the second embodiment, to implement correct re-sampling for reproduction, the pilot signal fr is set to fr=NfH (N: predetermined positive integer) and the sampling frequency fso is set to fso=MfH (M: positive integer). During recording, the value of M is recorded with the pilot signal fr, or the sampling frequency fso is recorded with an image signal and the pilot signal fr. Accordingly, even if the sampling frequency fso varies with the kind of solid-state image sensor used, re-sampling for reproduction can be implemented with an optimum sampling frequency fso, whereby it is possible to realize a CHSV system in which satisfactory compatibility with various other systems is retained.

The second embodiment is arranged so that, as shown in FIG. 16(b), the frequency divider 1631 divides by N the frequency of the pilot signal fr supplied from the BPF 1505 in accordance with the values of M and N and so that the programmable frequency divider 1635 divides by M the frequency of the signal supplied from the programmable VCO 1634 which oscillates at the center frequency MfH. However, this arrangement is only illustrative and another arrangement may be employed. For example, if a common divisor k (k: positive integer) is present with respect to the values of M and N and the expressions N'=N/k and M'=M/k can be obtained, the value of M' or the frequency fso/k may be recorded with an image signal and the pilot signal fr during recording and the programmable VCO 1634 of FIG. 16(b) may be oscillated at a center frequency M'fH. Further, the signal generated by the programmable VCO 1634 may be frequency-divided by M' in the programmable frequency divider 1635.

Since the sampling frequency of a solid-state image sensor is in general selected to be an integral multiple of fH, the provision of the above-described arrangement makes it possible to use various kinds of solid-state image sensors in CHSV systems with compatibility retained.

Although, in the second embodiment, the pilot signal fr is multiplexed with an image signal so that they can be recorded in succession, the pilot signal fr may be multiplexed with at least either one of the horizontal and vertical blanking portions of the image signal. In this case, it is possible to reduce the probability that noise such as moiré may occur in the image signal.

In the above-described case, if the sampling signal $f_{SO}$ phase-synchronized with the pilot signal $f_r$ is to be formed by the PLL circuit on the reproduction side, the output signal of the phase comparator 1632 of FIG. 16(*b*) may be held by a sample-and-hold circuit or the like during the interval in which no pilot signal is obtained.

A third embodiment of the present invention will be described below.

Figure 17:
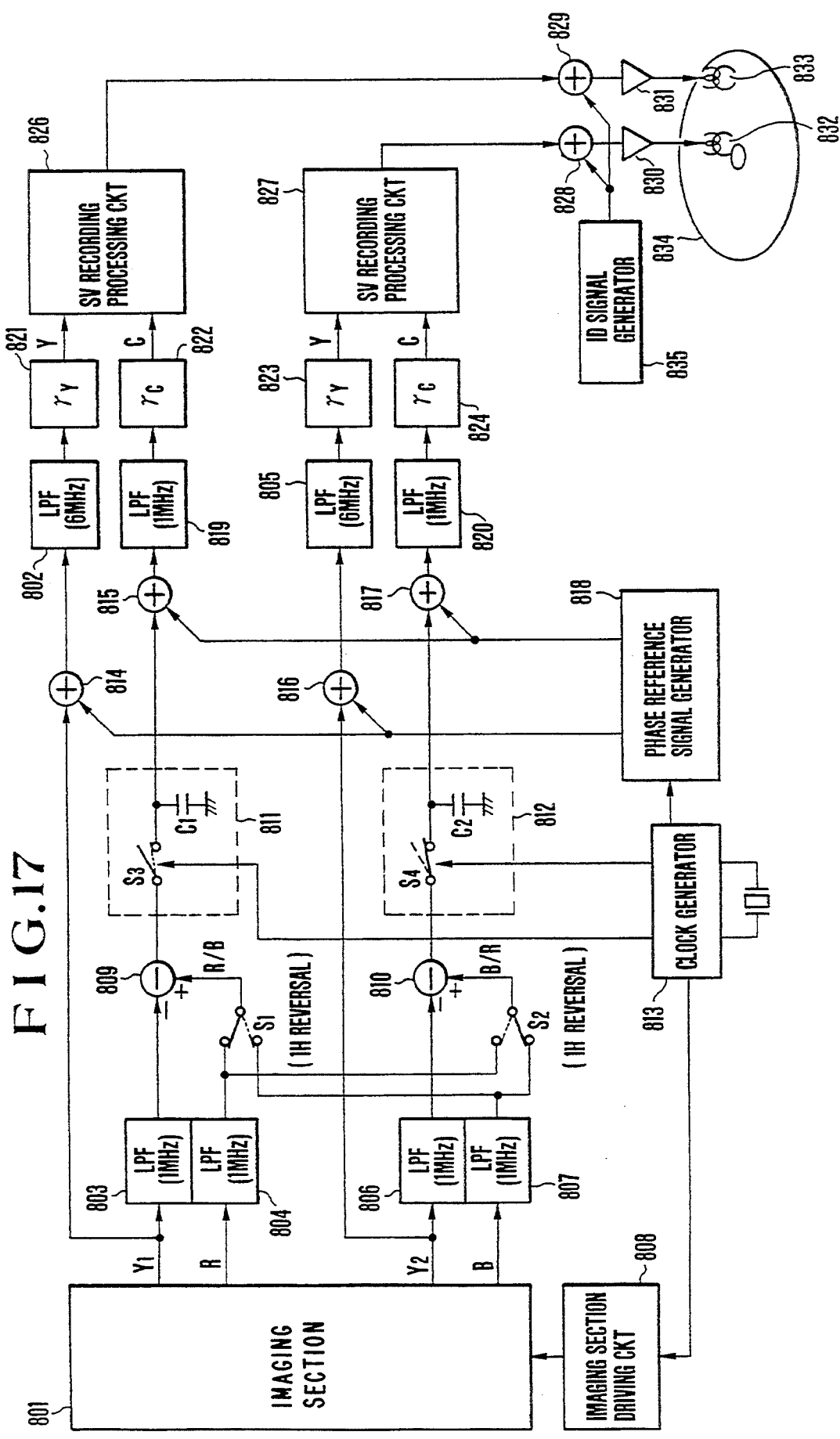
FIG. 17 is a block diagram schematically showing the arrangement of the recording apparatus of a CHSV system according to a third embodiment of the present invention.

In the third embodiment, the relationship between the sampling frequency $f_{SO}$ of the solid-state image sensor used in the recording apparatus shown in FIG. 17 and the carrier frequency $f_{ID}$ ($=13$ $f_H$) of an ID signal is represented as $f_{SO}=(M/N)f_{ID}$ and, in a recording operation, the values of M and N are recorded together with an image signal and the ID signal on a magnetic disk which serves as a recording medium.

In the third embodiment, the values of M and N are recorded together with an image signal by adding code data indicative of the values of M and N to the vertical blanking portion of the image signal.

The ID signal, which is generated by the ID signal generator 835 of FIG. 17, is recorded as a nonmodulated signal 13 $f_H$ ($f_H$: horizontal synchronizing frequency of the NTSC system) which is not modulated in accordance with digital data.

In a reproducing apparatus, the sampling frequency $f_{SO}$ is restored on the basis of the aforesaid ID signal and the values of M and N, and an image signal reproduced from the magnetic disk is re-sampled by using the sampling frequency $f_{SO}$ to restore the original image signal.

The reproducing apparatus of a CHSV system according to the third embodiment of the present invention will be described below.

Figure 18B:
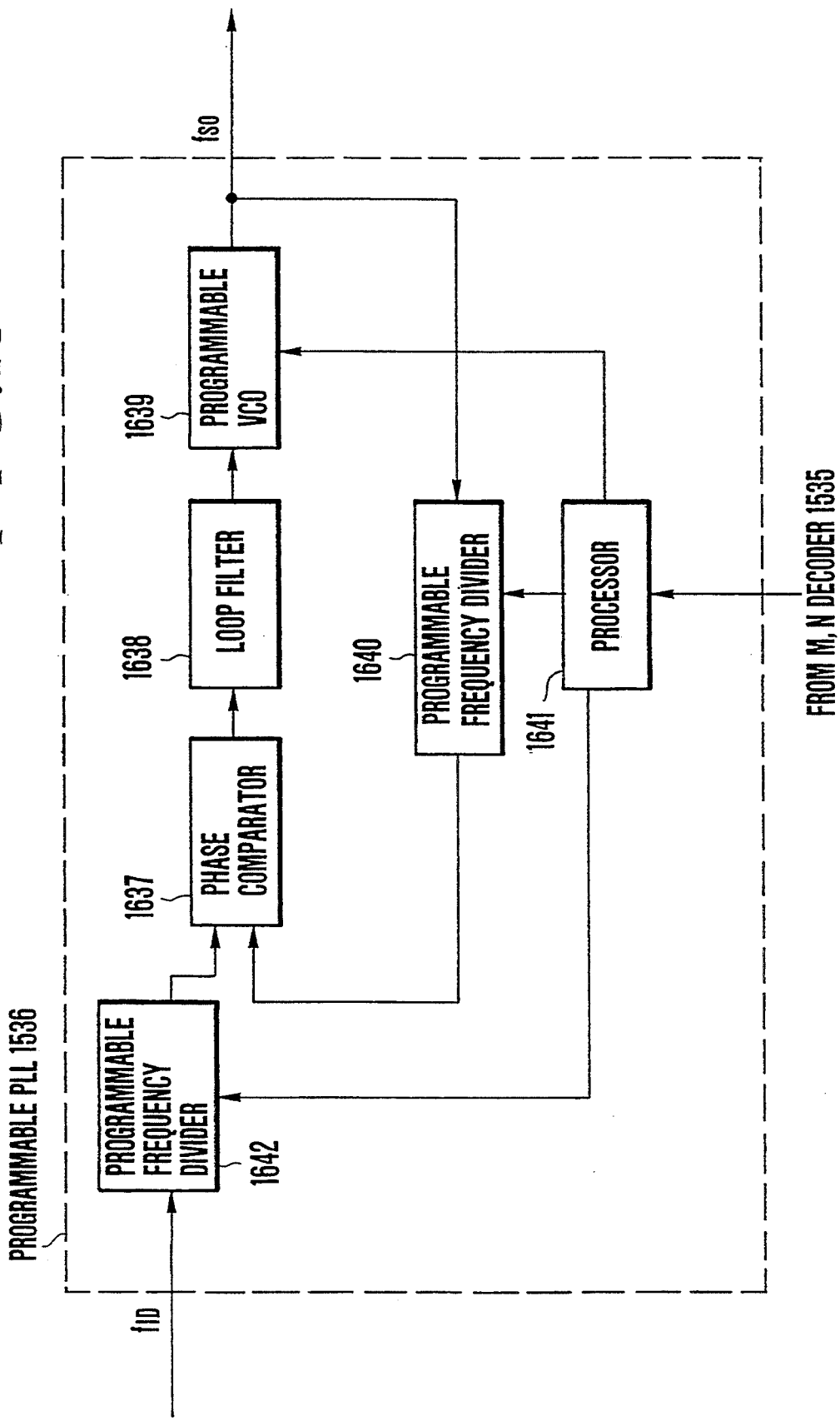
FIG. 18(b) is a detailed block diagram showing the arrangement of the programmable PLL circuit shown in FIG. 18(a).

FIG. 18(*a*) is a block diagram showing the reproducing apparatus of the CHSV system according to the third embodiment of the present invention. In FIG. 18(*a*), like reference numerals are used to denote the like or corresponding elements shown in FIG. 14(*a*), and detailed description is omitted.

Referring to FIG. 18(*a*), the values of M and N are decoded from code data added to a vertical blanking portion, by an M, N decoder 1535, and the values of M and N and an ID signal $f_{ID}$ separated from a reproduced signal by the LPF 130 are inputted to a programmable PLL circuit 1536.

The programmable PLL circuit 1536 forms a sampling frequency $f_{SO}$ for recording in accordance with these values. In this case, the signal of sampling frequency $f_{SO}$ is a signal which corresponds to time base variations such as jitter occurring in reproduction.

FIG. 18(*b*) is a detailed block diagram showing the arrangement of the programmable PLL circuit 1536 of FIG. 18(*a*). The ID signal $F_{ID}$ ($=13f_H$) supplied from the LPF 1530 is frequency-divided by N by a programmable frequency divider 1642. More specifically, the value of N is inputted from the M, N decoder 1535 to a processor 1641 and the counter of the programmable frequency divider 1642 is set under the control of the processor 1641, so that the frequency of the ID signal $F_{ID}$ is divided by N. The ID signal $F_{ID}$ divided by N is inputted to a phase comparator 1637. The output of the phase comparator 1637 is inputted to a loop filter 1638, and the output of the loop filter 1638 is supplied to a programmable VCO 1639. The processor 1641 calculates the center frequency $F_{SO}'$ of the programmable VCO 1639 on the basis of the values of M and N supplied from the M, N decoder 1535. To cause the programmable VCO 1639 to oscillate at the frequency $f_{SO}'$, the processor 1641 sets the oscillation frequency $F_{SO}'$ of the programmable VCO 1639 by switching the values of the inductance or capacitance of the programmable VCO 1639 or by controlling the voltage of a variable capacitor.

The output of the programmable VCO 1639 is inputted to a programmable frequency divider 1640. The programmable frequency divider 1640 sets its counter under the control of the processor 1641 on the basis of the value of M supplied from the M, N decoder 1535, and divides by M the frequency of the frequency signal $F_{SO}'$ outputted from the programmable VCO 1639. The output of the programmable frequency divider 1640 is inputted to the phase comparator 1637. In this manner, the sampling frequency signal $f_{SO}$ represented as $f_{SO}=(M/N)f_{ID}$ is formed. Since the subsequent operation is the same as explained in connection with FIG. 14(*a*), explanation is omitted.

Regarding multiplexing of the values of M and N, code data indicative of these values may be multiplexed with the vertical blanking portion of an image signal by utilizing a known technique such as that used in character multiplex broadcasting, and detailed description is omitted.

Although, in the embodiment shown in FIGS. 18(*a*) and 18(*b*), code data indicative of the values of M and N is multiplexed with the vertical blanking portion of a luminance signal, another method may be employed. For example, the code data may be multiplexed with the vertical blanking portion of a chrominance signal.

There is another method in which the code data indicative of the values of M and N is multiplexed with the user's area of an ID signal. In this case, since $F_{ID}$ is modulated in accordance with the code data, it is necessary to eliminate the modulating component by, e.g. squaring $F_{ID}$ before $F_{ID}$ is supplied to a PLL circuit.

As described above, in the third embodiment, the sampling frequency $f_{SO}$ is set to $f_{SO}=(M/N)f_{ID}$, and the values of M and N are recorded with an image signal and the ID signal $F_{ID}$ in a recording operation, while, in a reproducing operation, the re-sampling signal $f_{SO}$ for reproduction is formed from the values of M and N and the ID signal $f_{ID}$. Accordingly, even if the sampling frequency $f_{SO}$ varies with the kind of solid-state image sensor used, re-sampling for reproduction can be implemented with an optimum sampling frequency $f_{SO}$, whereby it is possible to realize a CHSV system in which satisfactory compatibility with various other systems is retained. Since the sampling frequency of a solid-state image sensor is in general selected to be an integral multiple of $f_H$, the provision of the above-described arrangement makes it possible to use various kinds of solid-state image sensors in CHSV systems with compatibility retained.

Although, in the third embodiment, the ID signal $F_{ID}$ is multiplexed with an image signal so that they can be recorded in succession, the ID signal $F_{ID}$ may be multiplexed with at least either one of the horizontal and vertical blanking portions of the image signal. In this case, it is possible to reduce the probability that noise such as moiré, may occur in the image signal. In the above-described case, if the sampling signal $f_{SO}$ phase-synchronized with the ID signal $F_{ID}$ is to be formed by the PLL circuit on the reproduction side, the output signal of the phase comparator 1637 of FIG.

18(b) may be held by a sample-and-hold circuit or the like during the interval in which no pilot signal is obtained.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. An image signal processing apparatus for processing an image signal, comprising:
   (A) clock signal generating means for generating a clock signal having a frequency $f_{so}$;
   (B) image signal generating means arranged to operate in accordance with the clock signal generated by said clock signal generating means to generate an image signal;
   (C) pilot signal generating means for generating a pilot signal having a frequency $f_r$;
   (D) information signal generating means for generating an information signal corresponding to values of M and N which satisfy $f_{so}/M = f_r/N$; and
   (E) recording means arranged to form a recording signal by multiplexing the pilot signal generated by said pilot signal generating means and the information signal generated by said information signal generating means with the image signal generated by said image signal generating means and to record the recording signal thus formed on a recording medium.

2. An apparatus according to claim 1, further comprising:
   (F) reproducing means for reproducing the recording signal recorded on said recording medium and for outputting the reproduced signal;
   (G) clock signal forming means arranged to separate said pilot signal and said information signal from the recording signal reproduced from said recording medium by said reproducing means and to form the clock signal having said frequency $f_{so}$ in accordance with the separated pilot signal and information signal and output said clock signal; and
   (H) sampling image signal forming means arranged to separate said image signal from the recording signal reproduced from said recording medium by said reproducing means and to sample the separated image signal in accordance with the clock signal outputted from said clock signal forming means, thereby forming a sampling image signal.

3. An apparatus according to claim 1, wherein said recording means is arranged to frequency-multiplex the information signal generated by said information signal generating means with the image signal generated by said image signal generating means.

4. An apparatus according to claim 1, wherein said recording means is arranged to multiplex the information signal generated by said information signal generating means with a vertical blanking portion in the image signal generated by said image signal generating means.

5. An apparatus according to claim 1, wherein said image signal generating means includes a solid-state image sensing element for generating an image signal corresponding to an object to be photographed and solid-state image sensing element driving means for driving said solid-state image sensing element in accordance with the clock signal generated by said clock signal generating means.

6. An image signal processing apparatus for processing an image signal, comprising:
   (A) clock signal generating means for generating a clock signal having a frequency $f_{so}$;
   (B) image signal generating means arranged to operate in accordance with the clock signal generated by said clock signal generating means to generate an image signal having a horizontal scanning frequency $f_r$;
   (C) pilot signal generating means for generating a pilot signal having a frequency $f_r$;
   (D) numerical data generating means for generating numerical data indicative of the frequency $f_{so}$ of the clock signal output from the clock signal generating means or numerical data obtained by multiplying the frequency $f_{so}$ of the clock signal by the horizontal scanning frequency $f_h$ of the image signal; and
   (E) recording means for forming a recording signal by multiplexing the pilot signal generated by said pilot signal generating means and the numerical data generated by said numerical data generating means with the image signal generated by said image signal generating means and for recording the formed recording signal on a recording medium.

7. An apparatus according to claim 6, further comprising:
   (F) reproducing means for reproducing and outputting the recording signal recorded on said recording medium;
   (G) clock signal forming means for separating said pilot signal and said numerical data from the recording signal reproduced from said recording medium by said reproducing means to form an output clock signal having said frequency of $f_h$ according to the separated numerical data; and
   (H) sampling image signal forming means for separating said image signal reproduced from said recording medium by said reproducing means and for forming a sampling image signal by sampling the separated image signal according to the clock signal output from said clock signal forming means.

8. An apparatus according to claim 6, wherein said recording means is arranged to multiplex the numerical data generated by said numerical data generating means with the image signal generated by said image signal generating means.

9. An apparatus according to claim 6, wherein said recording means is arranged to multiplex the numerical data generated by said numerical data generating means with a vertical blanking portion in the image signal generated by said image signal generating means.

10. An apparatus according to claim 6, wherein said image signal generating means includes a solid-state image sensing element for generating an image signal corresponding to an object to be photographed and solid-state image sensing element driving means for driving said solid-state image sensing element in accordance with the clock signal generated by said clock signal generating means.

11. An image signal recording and reproducing system for recording an image signal on a recording medium and reproducing the image signal recorded on said recording medium, comprising:

(A) clock signal generating means for generating a clock signal having a frequency $f_{so}$;

(B) image signal generating means arranged to operate in accordance with the clock signal generated by said clock signal generating means to generate an image signal;

(C) pilot signal generating means for generating a pilot signal having a frequency $fID = n\, fh$, where $fh$ is a horizontal synchronizing frequency;

(D) information signal generating means for generating an information signal corresponding to values of M and N which satisfy $f_{so}/M = fID/N$; and (E) recording means arranged to form a recording signal by the pilot signal generated by said pilot signal generating means and the information signal generated by said information signal generating means with the image signal generated by said image signal generating means and to record the recording signal thus formed on a recording medium.

12. An apparatus according to claim 6, further comprising:

(F) reproducing means for reproducing the recording signal recorded on said recording medium and for outputting the reproduced signal;

(G) clock signal forming means arranged to separate said pilot signal and said information signal from the recording signal reproduced from said recording medium by said reproducing means and to form the clock signal having said frequency $f_{so}$ in accordance with the separated pilot signal and information signal and output said clock signal; and (H) sampling image signal forming means arranged to separate said image signal from the recording signal reproduced from said recording medium by said reproducing means and to sample the separated sampling image signal in accordance with the clock signal outputted from said clock signal forming means, thereby forming a sampling image signal.

13. An apparatus according to claim 11, wherein said recording means is arranged to modulate the information signal generated by said information signal generating means by using the pilot signal generated by said pilot signal generating means, thereby forming a modulated information signal, and to frequency-multiplex the modulated information signal thus formed with the image signal generated by said image signal generating means.

14. An apparatus according to claim 11, wherein said recording means is arranged to frequency-multiplex the information signal generated by said information signal generating means with a vertical blanking portion in the image signal generated by said image signal generating means.

15. An apparatus according to claim 11, wherein said image signal generating means includes a solid state image sensing element for generating an image signal corresponding to an object to be photographed and solid-state image sensing element driving means for driving said solid-state image sensing element in accordance with the clock signal generated by said clock signal generating means.

* * * * *

UNITED STATES PATENT AND TRADEMARK OFFICE
CERTIFICATE OF CORRECTION

PATENT NO. : 5,444,546
DATED : August 22, 1995
INVENTOR(S) : Ryo Fujimoto

It is certified that error appears in the above-indentified patent and that said Letters Patent is hereby corrected as shown below:

Col. 1, line 6.   Change "," to -- / -- (first occurrence).

Col. 2, line 31.  Change "½" to -- ½$_T$ --.

Col. 6, line 26.  Change "Of" to -- of --.

Col. 13, line 62. Change "decode" to -- decoded --.

Col. 13, line 66. Change "I.e." to -- i.e., --.

Col. 16, line 38. After "e.g." insert -- , --.

Col. 18, line 14. Change "fr" to -- fh --.

Signed and Sealed this

Second Day of January, 1996

Attest:

Attesting Officer

BRUCE LEHMAN
Commissioner of Patents and Trademarks